US012597157B2

(12) United States Patent
Lee et al.

(10) Patent No.: US 12,597,157 B2
(45) Date of Patent: Apr. 7, 2026

(54) ELECTRONIC DEVICE FOR CORRECTING POSITION OF EXTERNAL DEVICE AND OPERATION METHOD THEREOF

(71) Applicant: Samsung Electronics Co., Ltd., Suwon-si (KR)

(72) Inventors: Muyeol Lee, Suwon-si (KR); Eunsoo Park, Suwon-si (KR); Changwoo Son, Suwon-si (KR); Hyunsuk Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 521 days.

(21) Appl. No.: 18/172,686

(22) Filed: Feb. 22, 2023

(65) Prior Publication Data

US 2023/0196607 A1 Jun. 22, 2023

Related U.S. Application Data

(63) Continuation of application No. PCT/KR2021/008988, filed on Jul. 13, 2021.

(30) Foreign Application Priority Data

Aug. 26, 2020 (KR) ........................ 10-2020-0107702

(51) Int. Cl.
*G06T 7/70* (2017.01)
*G06F 3/14* (2006.01)
(Continued)

(52) U.S. Cl.
CPC ................. *G06T 7/70* (2017.01); *G06F 3/14* (2013.01); *G06T 17/00* (2013.01); *G06V 10/761* (2022.01); *H04N 23/69* (2023.01)

(58) Field of Classification Search
CPC ......... G06T 7/70; G06T 17/00; G06V 10/761; H04N 23/69; G06F 3/14
(Continued)

(56) References Cited

U.S. PATENT DOCUMENTS 7,460,951 B2 * 12/2008 Altan ................... G06V 10/806
701/518
2008/0297401 A1 12/2008 Nishida
(Continued)

FOREIGN PATENT DOCUMENTS

DE 102018132808 A1 * 6/2020 ............. G06V 20/58
DE 102019128988 A1 * 4/2021 ............. G06V 20/58
(Continued)

OTHER PUBLICATIONS

Dezhi Gao, J. Duan, Xining Yang and B. Zheng, "A method of spatial calibration for camera and radar," 2010 8th World Congress on Intelligent Control and Automation, Jinan, 2010, pp. 6211-6215, doi: 10.1109/WCICA.2010.5554411. (Year: 2010).*
(Continued)

*Primary Examiner* — Jennifer Mehmood
*Assistant Examiner* — Eric James Shoemaker
(74) *Attorney, Agent, or Firm* — Jefferson IP Law, LLP

(57) ABSTRACT

A device and a method for correcting an error in position information of an external device recognized by internal circuits in an electronic device are provided. The electronic device includes a housing, a first camera disposed in a first region of an inner space of the housing, a position estimation device disposed in a second region, different from the first region, in the inner space, and a processor operatively connected to the first camera and the position estimation device, wherein the processor can identify a first distance between the first camera and the position estimation device, estimate the position of the external device through the
(Continued)

position estimation device, and correct, on the basis of the estimated position of the external device and the first distance, the position of an object related to the external device in image information acquired through the first camera.

18 Claims, 22 Drawing Sheets

(51) Int. Cl.
| | | |
|---|---|---|
| *G06T 17/00* | (2006.01) | |
| *G06V 10/74* | (2022.01) | |
| *H04N 23/69* | (2023.01) | |

(58) Field of Classification Search
USPC .......................................................... 382/103
See application file for complete search history.

(56) References Cited

U.S. PATENT DOCUMENTS

| | | | |
|---|---|---|---|
| 2015/0312719 | A1 | 10/2015 | Cho et al. |
| 2018/0098000 | A1 | 4/2018 | Park et al. |
| 2018/0218220 | A1 | 8/2018 | Jung et al. |
| 2018/0233145 | A1 | 8/2018 | Bathiche et al. |
| 2019/0042831 | A1 | 2/2019 | Ahn et al. |
| 2020/0225706 | A1 | 7/2020 | Jung et al. |
| 2020/0264276 | A1 | 8/2020 | Yamazaki et al. |
| 2020/0348385 | A1 | 11/2020 | Schindler et al. |
| 2021/0033722 | A1 | 2/2021 | Sondergaard et al. |
| 2021/0239983 | A1 | 8/2021 | Song et al. |
| 2021/0302564 | A1 | 9/2021 | Lee |
| 2022/0201428 | A1 * | 6/2022 | Ertan ........................ G06T 7/70 |

FOREIGN PATENT DOCUMENTS

| | | | | |
|---|---|---|---|---|
| GB | 2588774 | B | * 12/2021 | ............... G06T 7/00 |
| JP | 4414245 | B2 | 2/2010 | |
| KR | 10-2010-0118449 | A | 11/2010 | |
| KR | 10-2015-0123394 | A | 11/2015 | |
| KR | 10-2018-0038111 | A | 4/2018 | |
| KR | 10-2018-0105855 | A | 10/2018 | |
| KR | 10-2019-0013224 | A | 2/2019 | |
| KR | 10-2019-0083757 | A | 7/2019 | |
| KR | 10-2019-0135870 | A | 12/2019 | |
| KR | 10-2020-0086830 | A | 7/2020 | |
| KR | 10-2020-0088319 | A | 7/2020 | |
| KR | 10-2020-0112421 | A | 10/2020 | |
| KR | 10-2021-0122101 | A | 10/2021 | |
| KR | 10-2022-0017489 | A | 2/2022 | |

OTHER PUBLICATIONS

Lam Nguyen, Francois Koenig, Kelly Sherbondy, "Augmented Reality Using Ultra-Wideband Radar Imagery" doi: 10.1117/12. 883285, Proc. of SPIE vol. 8021 802104-1, Downloaded from SPIE Digital Library on Jul. 6, 2011 to 158.12.60.98. (Year: 2010).*
International Search Report dated Oct. 19, 2021; International Appln. No. PCT/KR2021/008988.
Notice of Allowance dated Jul. 7, 2025, issued in Korean Application No. 10-2020-0107702.

* cited by examiner

FIG. 1

START

OPERATE CAMERA MODULE AND POSITION ESTIMATION MODULE — 501

IDENTIFY DISTANCE BETWEEN CAMERA MODULE
AND POSITION ESTIMATION MODULE — 503

ESTIMATE POSITION OF EXTERNAL DEVICE
THROUGH POSITION ESTIMATION MODULE — 505

CORRECT POSITION OF EXTERNAL DEVICE, BASED ON DISTANCE
BETWEEN CAMERA MODULE AND POSITION ESTIMATION MODULE — 507

END

ELECTRONIC DEVICE FOR CORRECTING POSITION OF EXTERNAL DEVICE AND OPERATION METHOD THEREOF

CROSS-REFERENCE TO RELATED APPLICATION(S)

This application is a continuation application, claiming priority under § 365(c), of an International application No. PCT/KR2021/008988, filed on Jul. 13, 2021, which is based on and claims the benefit of a Korean patent application number 10-2020-0107702, filed on Aug. 26, 2020, in the Korean Intellectual Property Office, the disclosure of which is incorporated by reference herein in its entirety.

BACKGROUND

1. Field

The disclosure relates to a device and a method for correcting an error of position information of an external device in an electrode device.

2. Description of Related Art

According to the development of a wireless communication technology, a demand level of a user for an electronic device is increasing as the electronic device (e.g., a communication electronic device) has been commonly used in a daily life. In order to meet the demand level of the user, various types of wireless communication technologies may be used. For example, the wireless communication technologies may include at least one of ultra-wideband (UWB) communication, wireless fidelity (Wi-Fi) communication, long-term evolution (LTE) communication, fifth generation (5G) communication (or new radio (NR) communication) or Bluetooth communication.

The above information is presented as background information only to assist with an understanding of the disclosure. No determination has been made, and no assertion is made, as to whether any of the above might be applicable as prior art with regard to the disclosure.

SUMMARY

An electronic device may identify a position of an external device by using wireless communication (e.g., UWB communication). For example, a position of the external device may include a distance and/or an angle (e.g., angle of arrival (AoA)) between an electronic device and the external device. For example, an electronic device may measure a distance from the external device through a ranging procedure by using a position estimation module of a UWB method. For example, an electronic device may estimate an angle (e.g., angle of arrival (AoA)) with respect to an external device, based on a phase difference of a signal received through a plurality of UWB antennas.

An electronic device may provide various functions, based on position information of an external device identified by using wireless communication. For example, the electronic device may display a virtual object on at least a part of an image (e.g., a preview image) acquired through a camera module, based on the position information of the external device identified by using the wireless communication, when an augmented reality (AR) function is provided.

In an electronic device, an error between a position of an external device recognized by a camera module and a position of the external device acquired through a position estimation module may occur due to a difference of the distance between the positions at which the position estimation module and the camera module are disposed in an inner space of the electronic device. In this case, the electronic device may display a virtual object on an erroneous position of a display due to the error between the positions of the external device recognized by the position estimation module and the camera module.

Aspects of the disclosure are to address at least the above-mentioned problems and/or disadvantages and to provide at least the advantages described below. Accordingly, an aspect of the disclosure is to provide a device and a method of correcting an error of position information of an external device recognized by inner circuits (e.g., a camera module and a position estimation module) in an electronic device.

Additional aspects will be set forth in part in the description which follows and, in part, will be apparent from the description, or may be learned by practice of the presented embodiments.

In accordance with an aspect of the disclosure, an electronic device is provided. The electronic device includes a housing, a first camera module disposed in a first region of an inner space of the housing, a position estimation module disposed in a second region different from the first region of the inner space, and a processor operatively connected to the first camera module and the position estimation module, wherein the processor is configured to identify a first distance between the first camera module and the position estimation module, estimate a position of an external device through the position estimation module, and correct a position of an object related to the external device in image information acquired through the first camera module, based on the first distance and the estimated position of the external device.

In accordance with another aspect of the disclosure, a method of operating an electronic device is provided. The method includes identifying a first distance between a first camera module disposed in a first region in an inner space of the electronic device and a position estimation module disposed in a second region different from the first region in the inner space, estimating a position of an external device through the position estimation module, and correcting a position of an object related to the external device in image information acquired through the first camera module, based on the first distance and the estimated position of the external device.

According to various embodiments of the disclosure, an electronic device may correct position information of an external device identified by a position estimation module to correspond to that of a camera module, based on the distance between the position estimation module and the camera module, so that various functions using the position information of the external device identified through the position estimation module can be provided.

According to various embodiments, an electronic device may selectively correct an error of position information of an external device, between a position estimation module and a camera module, based on photographing angle variance of the external device, when an optical zoom function of the camera module is provided, so that an unnecessary resource consumption for correcting the error of the position information of the inner circuits can be reduced.

According to various embodiments, based on the angle between a first housing and a second housing, a foldable electronic device may selectively correct an error of position information of an external device, between a position estimation module disposed in the first housing and a camera module disposed in the second housing, so that an unnecessary resource consumption for correcting the error of the position information of the inner circuits can be reduced, and various functions using the position information of the external device identified through the position estimation module can be provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1 is a block diagram of an electronic device within a network environment according to an embodiment of the disclosure;

The same reference numerals are used to represent the same elements throughout the drawings.

DETAILED DESCRIPTION

Figure 2A:
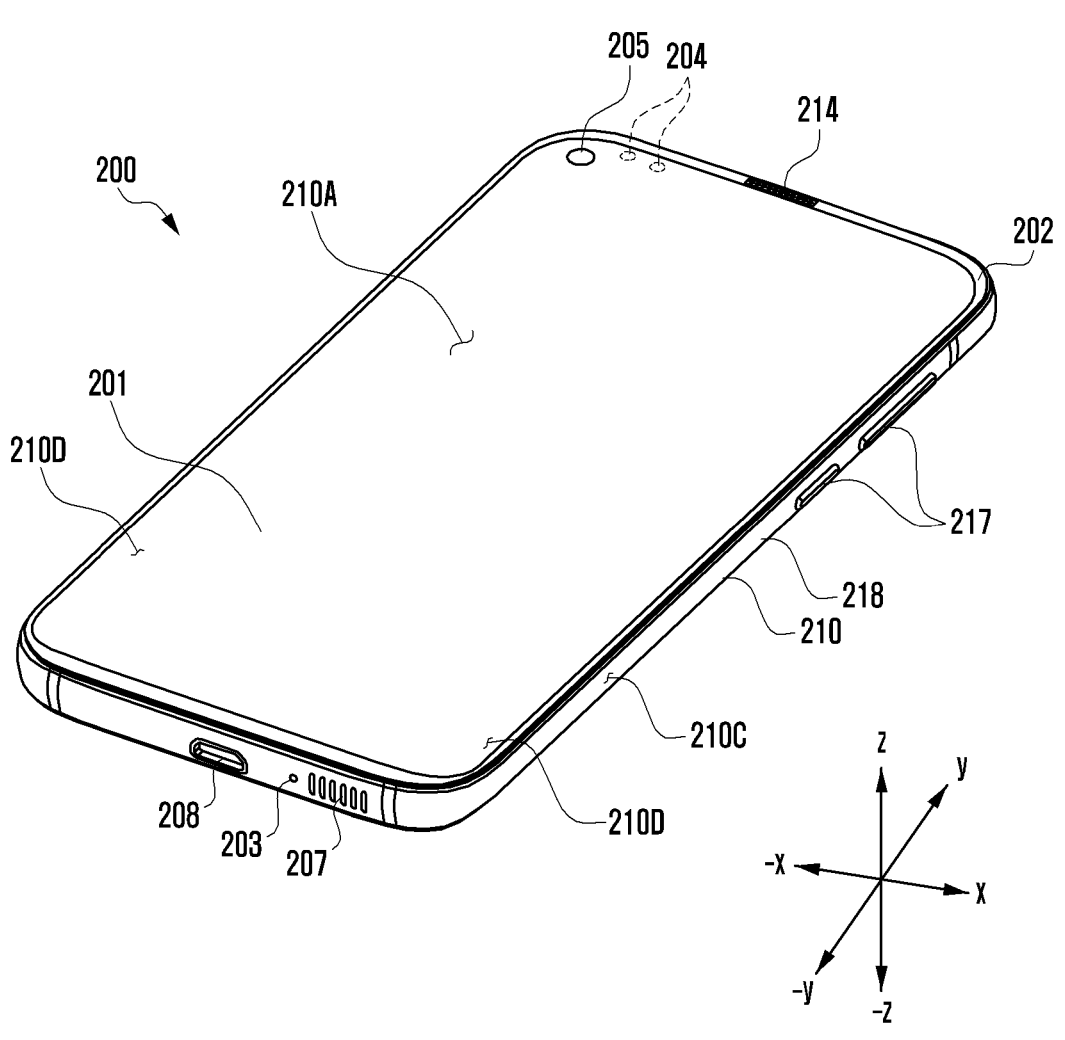
FIG. 2A is a front perspective view of an electronic device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
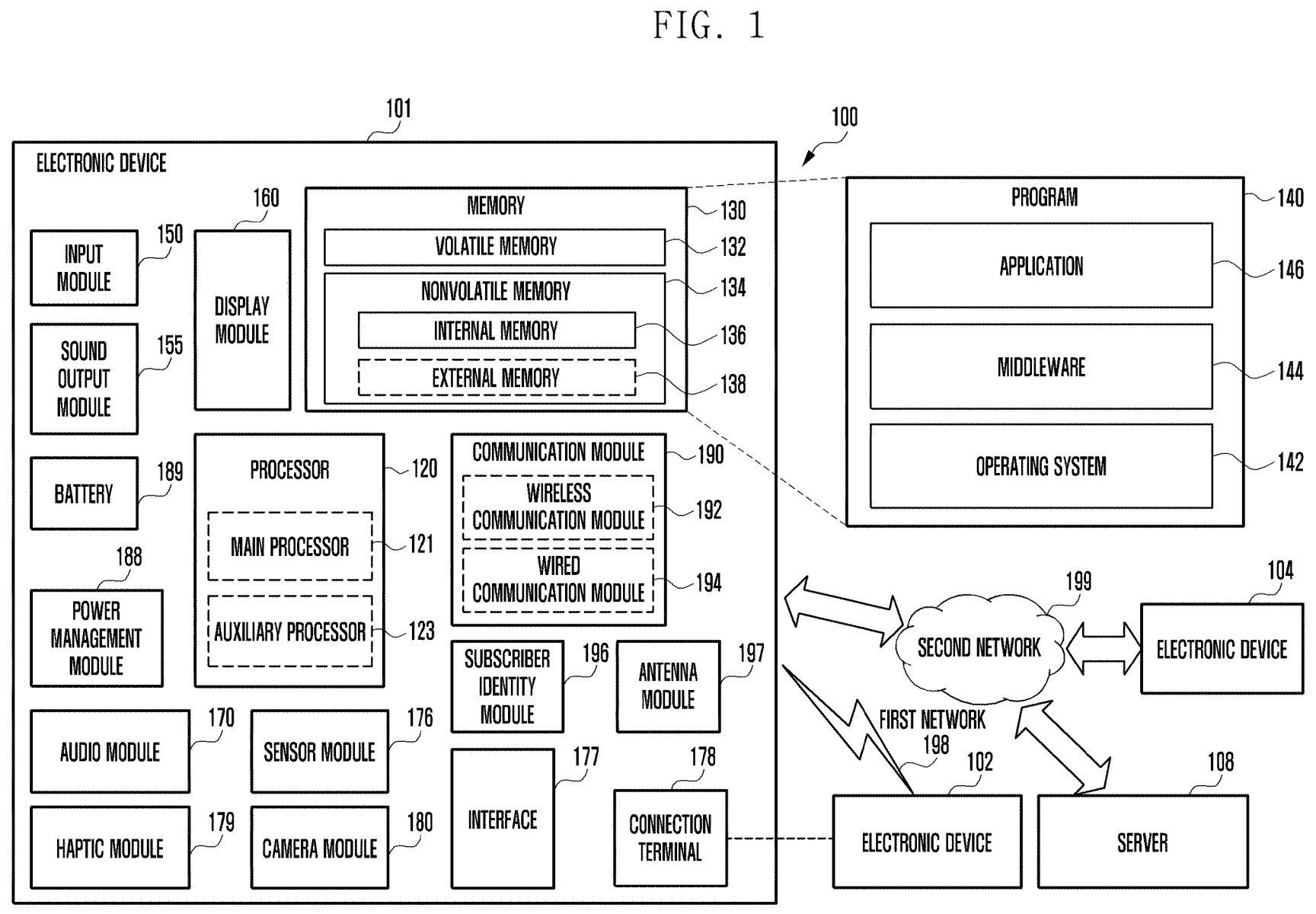

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment, the electronic device 101 may communicate with the external electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In some embodiments, at least one of the components (e.g., the connection terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

The connection terminal 178 may include a connector via which the electronic device 101 may be physically connected with the external electronic device (e.g., the external electronic device 102). According to an embodiment, the connection terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC. The subscriber identification module 196 may include a plurality of subscriber identification modules. For example, the plurality of subscriber identification modules may store different subscriber information.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a high frequency band (e.g., mmWave) antenna module. According to an embodiment, the high frequency band (e g, mmWave) antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band. For example, the plurality of antennas may include a patch array antenna and/or a dipole array antenna. For example, the plurality of antennas may include a patch array antenna and/or a dipole array antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102 and 104 or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with, "or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2B:
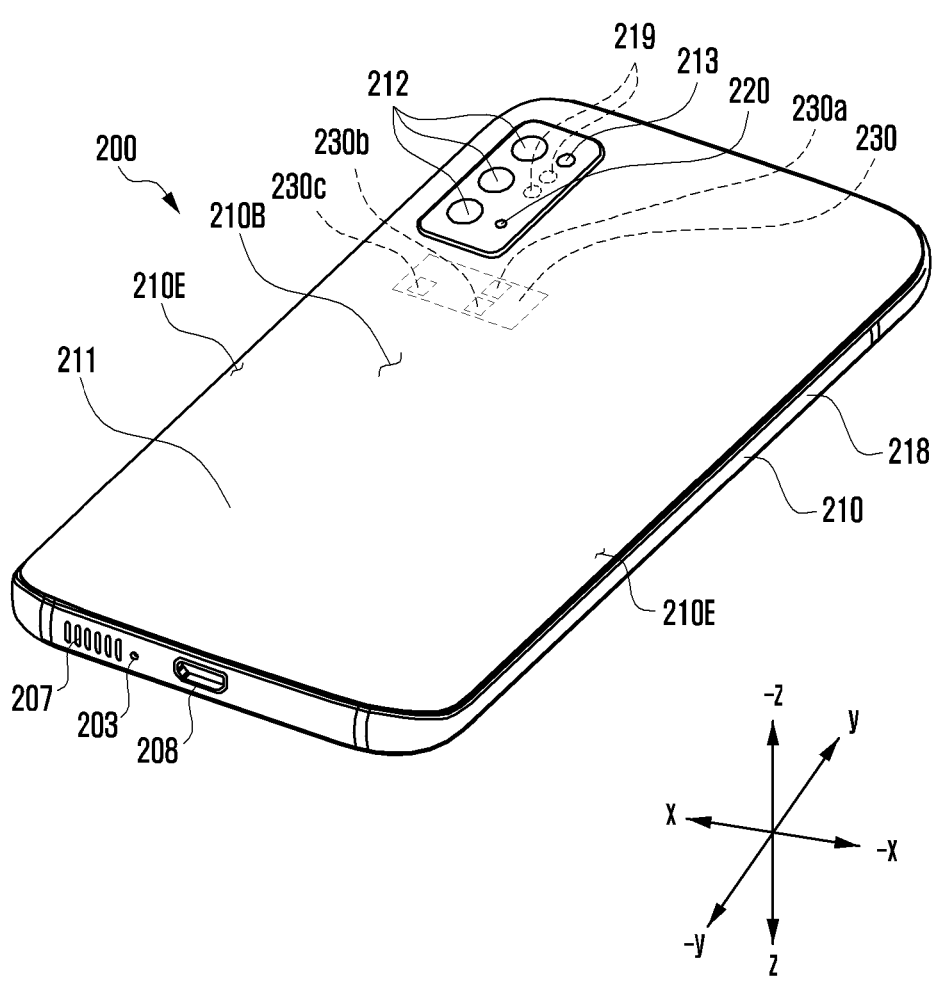
FIG. 2B is a rear perspective view of the electronic device of FIG. 2A, according to an embodiment of the disclosure.

FIG. 2A is a front perspective view of an electronic device according to an embodiment of the disclosure. FIG. 2B is a rear perspective view of the electronic device of FIG. 2A according to an embodiment of the disclosure. According to an embodiment, the electronic device 200 of FIGS. 2A and 2B may be at least partially similar to the electronic device 101 of FIG. 1 or further include other embodiments of the electronic device.

Referring to FIGS. 2A and 2B, according to various embodiments, the electronic device 200 may include a housing 210 including a first surface 210A (or a front surface), a second surface 210B (or a rear surface), and a side surface 210C surrounding a space (e.g., an inner space) between the first surface 210A and the second surface 210B. In another embodiment (not illustrated), the housing may be referred to as a structure having a part of the first surface 210A, the second surface 210B, and the side surface 210C of FIG. 2A. According to an embodiment, the first surface 210A may be configured by a front surface plate 202 (e.g., a glass plate including various coating layers or a polymer plate), at least a part of which is substantially transparent. The second surface 210B may be configured by a rear surface plate 211 which is substantially opaque. For example, the rear surface plate 211 may be made of coated or colored glass, ceramic, a polymer, a metal (e.g., aluminum, stainless steel (STS), or magnesium), or a combination of at least two materials thereof. The side surface 210C may be coupled to the front surface plate 202 and the rear surface plate 211 and configured by a side surface bezel structure 218 (or a side surface member) including a metal and/or a polymer. According to an embodiment, the rear surface plate 211 and the side surface bezel structure 218 may be integrally provided and include the same material (e.g., metal material such as aluminum).

According to various embodiments, the front surface plate 202 may include a first region 210D bent and seamlessly extending from the first surface 210A toward the rear surface plate 211 in the opposite ends of long edges of the front surface plate. According to an embodiment (refer to FIG. 2B), the rear surface plate 211 may include a second region 210E bent and seamlessly extending from the second surface 210B toward the front surface plate 202 in the opposite ends of long edges thereof. According to an embodiment, the front surface plate 202 or the rear surface plate 211 may include either the first region 210D or the second region 210E. According to an embodiment, the front surface plate 202 does not include the first region 210D and the second region 210E, and may include only an even plane disposed in parallel to the second surface 210B.

According to various embodiments, the electronic device 200 may include at least one of a display 201, input devices 203, 220, acoustic output devices 207, 214, sensor modules 204, 219, camera modules 205, 212, 213, a key input device 217, an indicator (not illustrated), and a connector 208. According to an embodiment, the electronic device 200 may omit at least one of the components (e.g., the key input device 217 or the indicator) or may additionally include another component.

According to an embodiment, the display 201 may be visually exposed through the majority part of the front surface plate 202. For example, at least a part of the display 201 may be visually exposed through the front surface plate 202 configuring the first surface 210A and the first region 210D. The display 201 may be coupled to or disposed adjacent to a touch sensing circuit, a pressure sensor capable of measuring strength (pressure) of a touch, and/or a digitizer of detecting a stylus pen of a magnetic field scheme. According to an embodiment, at least a part of the sensor modules 204, 219 and/or at least a part of the key input device 217 may be disposed in the first region 210D and/or the second region 210E.

According to an embodiment, the input devices 203, 220 may include microphones 203, 220. For example, the first microphone 203 may include a plurality of microphones disposed to detect a direction of a sound. For example, the second microphone 220 may be disposed on the second surface 210B so as to interwork with the second camera device 212.

According to an embodiment, the acoustic output devices 207, 214 may include speakers 207, 214. The speakers 207, 214 may include an external speaker 207 and a call receiver 214. According to an embodiment, the microphones 203, 220, the speakers 207, 214 and the connector 208 may be disposed in the space (or the inner space) of the electronic device 200 and exposed to the external environment through at least one hole formed through the housing 210. According to an embodiment, the hole formed through the housing 210 may be commonly used for the microphones 203, 220 and the speakers 207, 214. According to an embodiment, the acoustic output devices 207, 214 may include a speaker (e.g., piezo speaker) which is operated, by excluding the hole formed through the housing 210.

According to an embodiment, the sensor modules 204, 219 may generate a data value or an electronic signal corresponding to an internal operation state of the electronic device 200 or an external environment state. For example, the sensor modules 204, 219 may include the first sensor module 204 (e.g., proximity sensor) disposed on the first surface 210A of the housing 210 and/or a second sensor module (not illustrated) (e.g., a fingerprint sensor), and/or the third sensor module 219 disposed in the second surface 210B of the housing 210. For example, a fingerprint sensor may be disposed in a partial area of the first surface 210A, the second surface 210B, or the side surface 210C of the housing 210 or the lower part of the display 201. For example, the electronic device 200 may further include at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor 204, even though not illustrated.

According to an embodiment, the camera modules 205, 212, 213 may include the first camera device 205 disposed on the first surface 210A of the electronic device 200, the second camera device 212 disposed on the second surface 210B, and/or a flash 213. For example, the camera modules 205, 212 may include one or a plurality of lenses, image sensors, and/or an image signal processor. For example, the flash 213 may include a light emitting diode or a xenon lamp. According to an embodiment, two or more lenses (a wide-angle lens, a super-wide-angle lens, or a telephoto lens) and image sensors may be disposed on one surface of the electronic device 200.

According to an embodiment, the key input device 217 may be disposed on the side surface 210C of the housing 210. In another embodiment, the electronic device 200 may not include a part or all of the key input device 217, and the key input device 217, which is not included therein, may be implemented in a different form such as soft key on the display 201. In another embodiment, the key input device 217 may be implemented by using a pressure sensor included in the display 201 or the side surface 210C.

According to an embodiment, the indicator may be disposed on the first surface 210A of the housing 210. For example, the indicator may provide state information of the electronic device 200 in an optical type. In another embodiment, a light emitting element may provide light source interworking with an operation of the first camera device 205. For example, the indicator may include a light emitting diode (LED), an infrared light (IR) LED, and a xenon lamp.

According to an embodiment, the connector 208 may include a first connector hole 208 capable of accommodating a connector (e.g., USB connector) for transmitting/receiving power and/or data to/from an external electronic device (e.g., the electronic device 102). According to another embodiment (not illustrated), the electronic device 200 may include a second connector hole (or earphone jack) capable of accommodating a connector for transmitting/receiving an audio signal to/from an external electronic device.

According to various embodiments, a part of the camera module (e.g., the first camera device 205) of the camera modules 205, 212, a part of the sensor module (e.g., the first sensor module 204) of the sensor modules 204, 219, a part of the acoustic output device (e.g., the call receiver 214) of the acoustic output devices 207, 214 and/or the indicator may be disposed on a part of a screen display area of the display 201. For example, the first camera device 205, the first sensor module 204, the call receiver 214 and/or the indicator may be disposed on the rear surface of the screen display area of the display 201. According to an embodiment, the first camera device 205, the first sensor module 204, the call receiver 214 and/or the indicator may be disposed to be in contact with an external environment through a through-hole punched up to the front surface plate 202 of the display 201, in the inner space of the electronic device 200. In another embodiment, the first camera device 205 and/or the first sensor module 204 may be disposed to perform the function, without being virtually exposed through the front surface plate 202, in the inner space of the electronic device. In this case, the through-hole may not be necessary for the area facing the first camera device 205 and/or the first sensor module 204 of the display 201.

According to various embodiments, the electronic device 200 may include the antenna module 230 related to a position estimation of the external device (e.g., the electronic device 102) disposed in a space (e.g., the inner space). According to an embodiment, the antenna module 230 may include a plurality of antennas 230a, 230b and/or 230c for estimating the position of the external device. For example, the electronic device 200 may estimate the distance from and/or the angle with respect to the external device (e.g., angle of arrival (AOA)) by using at least two antennas among the plurality of antennas 230a, 230b and/or 230c included in the antenna module 230.

Figure 3A:
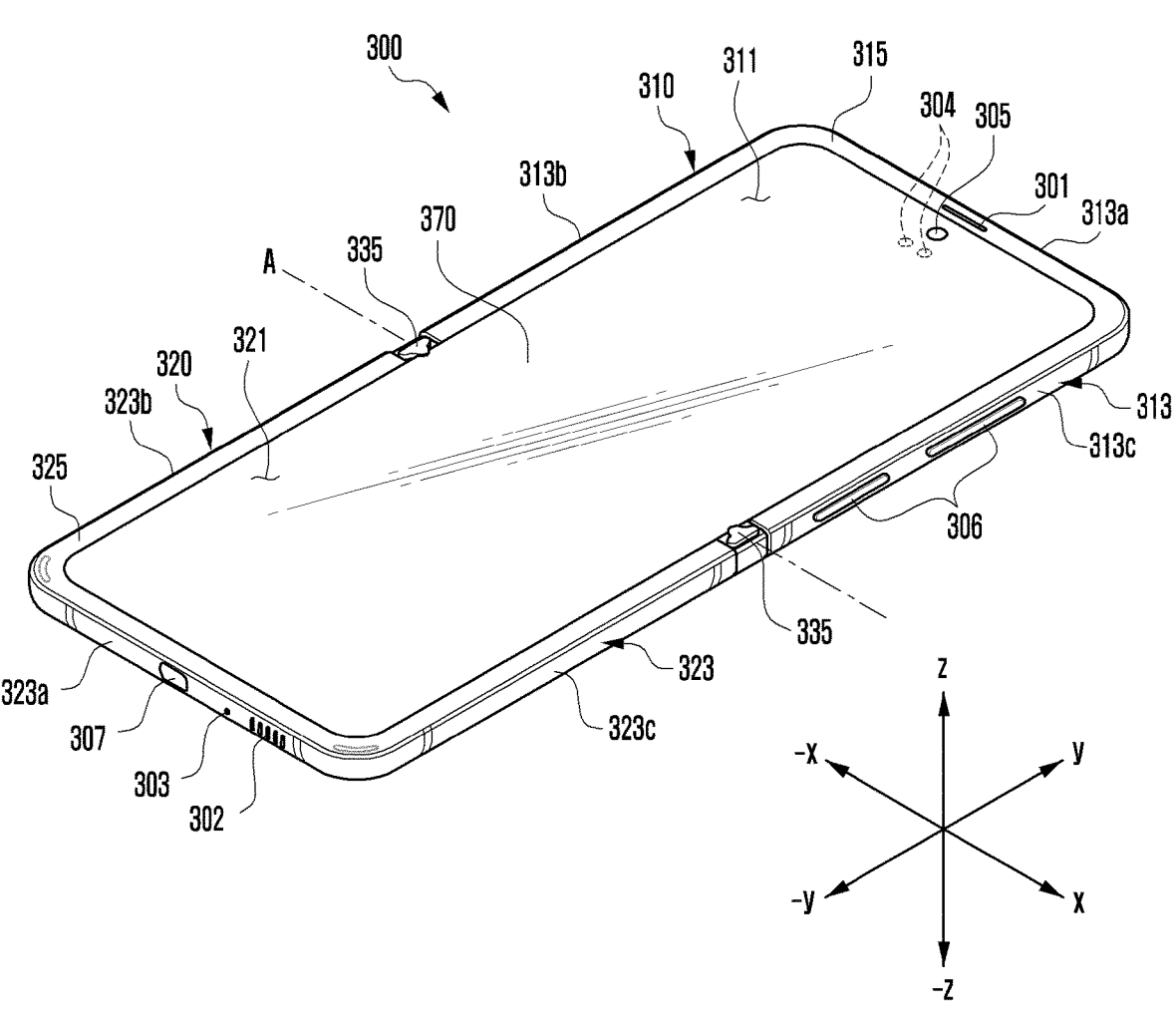
FIG. 3A is a front perspective view of an electronic device illustrating an unfolded state (or flat state) according to an embodiment of the disclosure.
Figure 3B:
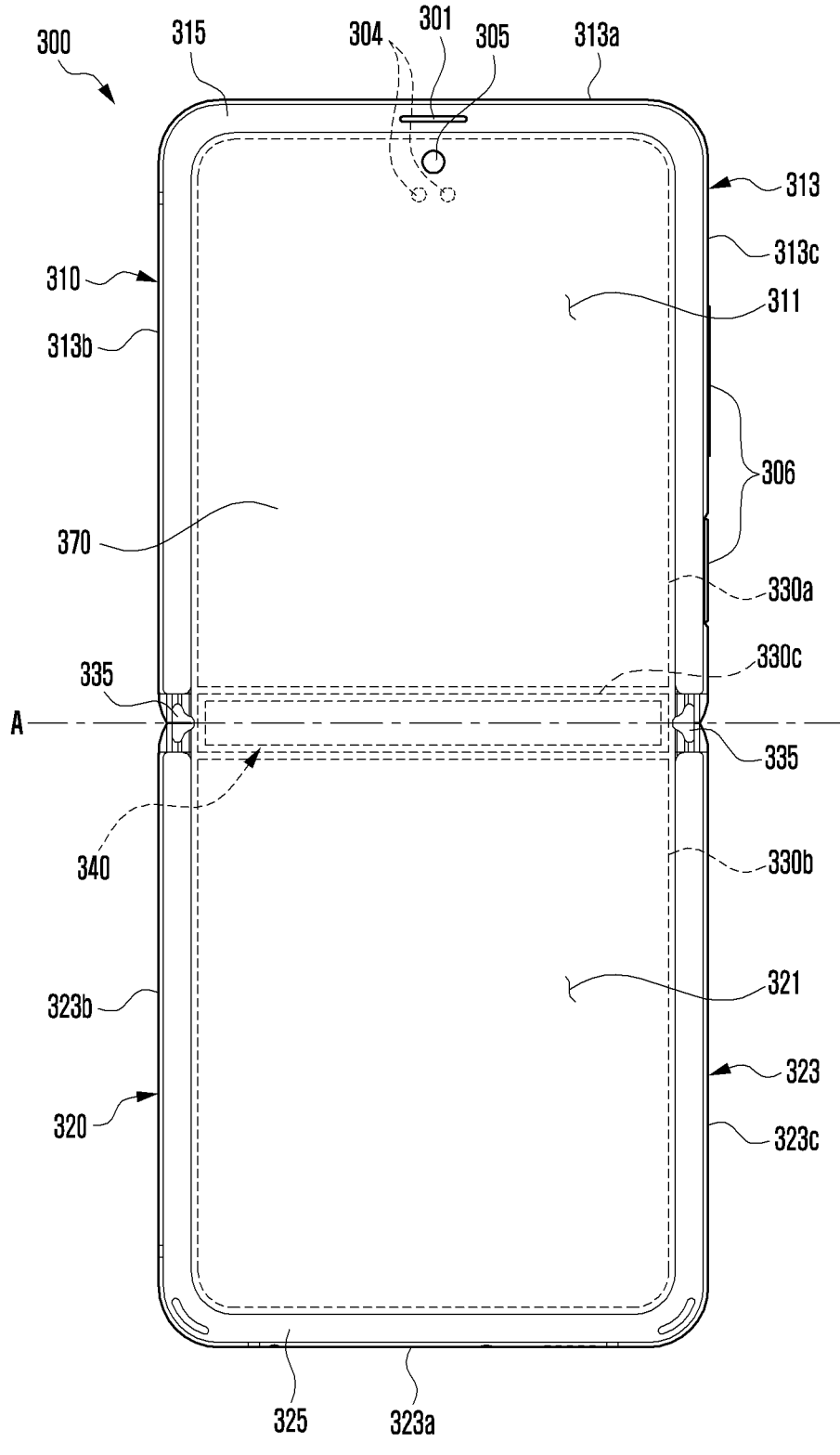
FIG. 3B is a plan view illustrating a front surface of an electronic device in an unfolded state according to an embodiment of the disclosure.
Figure 3C:
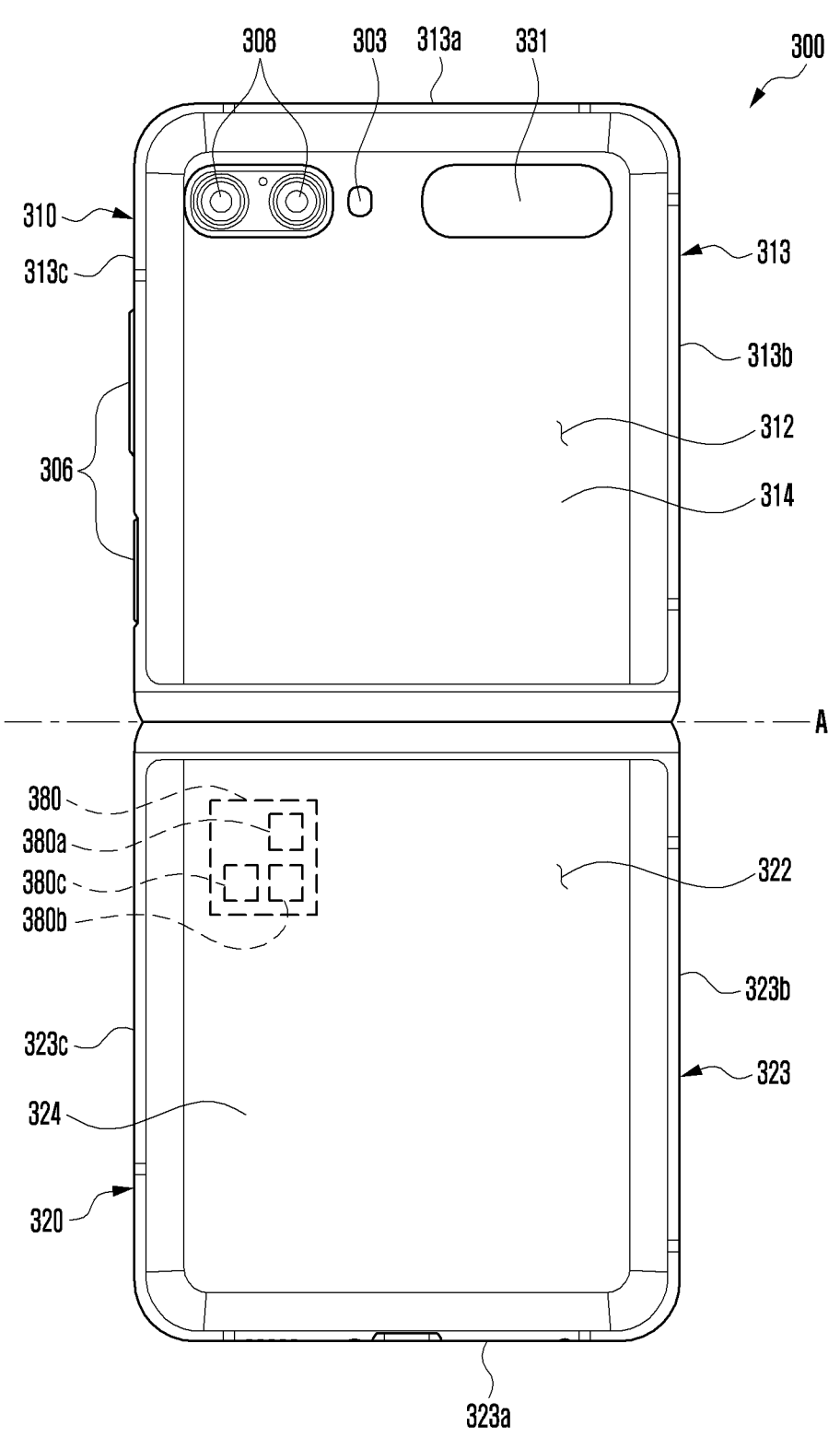
FIG. 3C is a plan view illustrating a rear surface of an electronic device in an unfolded state according to an embodiment of the disclosure.
Figure 3D:
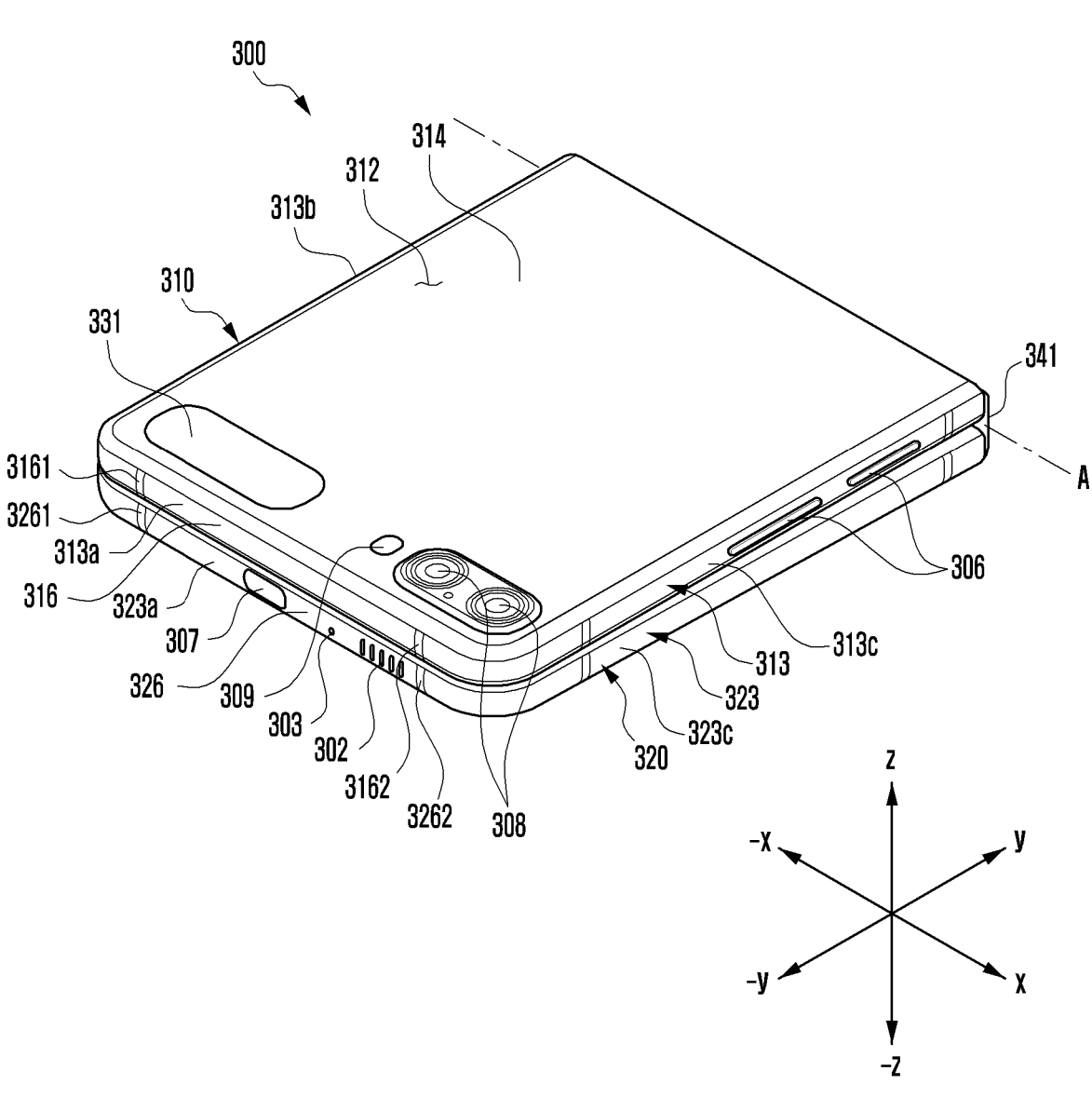
FIG. 3D is a perspective view of an electronic device illustrating a folded state according to an embodiment of the disclosure.

FIG. 3A is a front perspective view of an electronic device 300 illustrating an unfolded state (or flat state) according to an embodiment of the disclosure. FIG. 3B is a plan view illustrating a front surface of the electronic device 300 in an unfolded state according to an embodiment of the disclosure. FIG. 3C is a plan view illustrating a rear surface of the electronic device 300 in an unfolded state according to an embodiment of the disclosure. FIG. 3D is a perspective view of the electronic device 300 illustrating a folded state according to an embodiment of the disclosure. According to an embodiment, the electronic device 300 of FIGS. 3A to 3D may be at least partially similar to the electronic device 101 of FIG. 1 or further include other embodiments of the electronic device.

Referring to FIGS. 3A to 3D, according to various embodiments, the electronic device 300 may include a part of housings 310, 320 (e.g., foldable housing) rotatably coupled to be folded to face each other with reference to a hinge module (e.g., the hinge module 340 of FIG. 3B). According to an embodiment, the hinge housing 340 may be disposed in the X axis direction or in the Y axis direction. According to an embodiment, two or more hinge modules 340 may be disposed to be folded in the same direction or in the different directions. According to an embodiment, the electronic device 300 may include a flexible display 370 (e.g., a foldable display) disposed in an area configured by a pair of the housings 310, 320. According to an embodiment, the first housing 310 and the second housing 320 are disposed at opposite sides of the folding axis (axis A), and have a substantially symmetrical shape with respect to the folding axis (axis A). According to an embodiment, the angle or the distance made by the first housing 310 and the second housing 320 may vary according to whether a state of the electronic device 300 is in an unfolded state (flat state), in a folded state, or in an intermediate state.

According to various embodiments, a pair of housings 310, 320 may include the first housing 310 (e.g., a first housing structure) coupled to the hinge module 340 and the second housing 320 (e.g., a second housing structure) coupled to the hinge module 340. According to an embodiment, the first housing 310 may include a first surface 311 oriented in a first direction (e.g., a front surface direction) (z axis direction) and a second surface 312 oriented in a second direction (e.g., a rear surface direction) (−z axis direction) opposite to the first surface 311, in the unfolded state. According to an embodiment, the second housing 320 may include a third surface 321 oriented in the first direction (z axis direction) and a fourth surface 322 oriented in the second direction (−z axis direction), in the unfolded state. According to an embodiment, in the electronic device 300, the first surface 311 of the first housing 310 and the third surface 321 of the second housing 320 are oriented in the first direction (z axis direction) which is substantially the same direction, in the unfolded state, and the first surface 311 (or the second surface 312) and the third surface 321 (or the fourth surface 322) may be operated to face each other, in the folded state (e.g., in-folding manner). According to an embodiment, in the electronic device 300, the second surface 312 of the first housing 310 and the fourth surface 322 of the second housing 320 are oriented in the second direction (−z axis direction) which is substantially the same direction, in the unfolded state, and the second surface 312 (or the first surface 311) and the fourth surface 322 (or the third surface 321) may be operated to face the directions opposite to each other, in the folded state. For example, in the folded state, the second surface 312 may be oriented in the first direction (z axis direction) and the fourth surface 322 may be oriented in the second direction (−z axis direction).

According to an embodiment, in the electronic device 300, the first surface 311 of the first housing 310 and the third surface 321 of the second housing 312 are oriented in the first direction (z axis direction) which is substantially the same direction, in the unfolded state, and the first surface 311 and the third surface 321 may be operated to face the directions opposite to each other, in the folded state (e.g., out-folding manner). For example, in the folded state, the first surface 311 may be oriented in the first direction (z axis direction), and the third surface 321 may be oriented in the second direction (−z axis direction). For example, in the electronic device 300, in the unfolded state, the second surface 312 of the first housing 310 and the fourth surface 322 of the second housing 320 may be oriented in the second direction (−z axis direction) which is substantially the same direction, and in the folded state, the second surface 312 and the fourth surface 322 may be operated to face each other.

According to various embodiments, the first housing 310 may include a first side surface frame 313 which at least partly configure an appearance of the electronic device 300 and a first rear surface cover 314 which is coupled to the first side surface frame 313 and configures at least a part of the second surface 312 of the electronic device 300. According to an embodiment, the first side surface frame 313 may include a first side surface 313*a*, a second side surface 313*b* extending from one end of the first side surface 313*a*, and a third side surface 313*c* extending from the other end of the first side surface 313*a*. According to an embodiment, the first side surface frame 313 may be configured in an oblong shape (e.g., square or rectangle) through the first side surface 313*a*, the second side surface 313*b*, and the third side surface 313*c*.

According to various embodiments, the second housing 320 may include a second side surface frame 323 which at least partly configure an appearance of the electronic device 300 and a second rear surface cover 324 which is coupled to the second side surface frame 323 and configures at least a part of the fourth surface 322 of the electronic device 300. According to an embodiment, the second side surface frame 323 may include a fourth side surface 323*a*, a fifth side surface 323*b* extending from one end of the fourth side surface 323*a*, and a sixth side surface 323*c* extending from the other end of the fourth side surface 323*a*. According to an embodiment, the second side surface frame 323 may be configured in an oblong shape through the fourth side surface 323*a*, the fifth side surface 323*b*, and the sixth side surface 323*c*.

According to various embodiments, a pair of the housings 310, 320 may not be limited to the shape and coupling as illustrated, and may be implemented by the combination and/or coupling of other shapes or components. For example, the first side surface frame 313 may be integrally configured with the first rear surface cover 314, and the second side surface frame 323 may be integrally configured with the second rear surface cover 324.

According to various embodiments, in the electronic device 300, the second side surface 313*b* of the first side surface frame 313 and the fifth side surface 323*b* of the second side surface frame 323 may be connected in the unfolded state. According to an embodiment, in the electronic device 300, the third side surface 313*c* of the first side surface frame 313 and the sixth side surface 323*c* of the second side surface frame 323 may be connected in the unfolded state. According to an embodiment, in the electronic device 300, the combined length of the second side surface 313*b* and the fifth side surface 323*b* may be configured to be longer than the length of the first side surface 313*a* and/or the fourth side surface 323*a*, in the unfolded state. In addition, the combined length of the third side surface 313*c* and the sixth side surface 323*c* may be configured to be longer than the length of the first side surface 313*a* and/or the fourth side surface 323*a*.

According to various embodiments, the first side surface frame 313 and/or the second side surface frame 323 may be made of a metal or may further include a polymer molded into the metal. According to an embodiment, the first side surface frame 313 and/or the second side surface frame 323 may include at least one conductive part 316 and/or 326 which is electrically segmented through at least one segmentation part 3161, 3162 and/or 3261, 3262 made of a polymer. For example, the at least one conductive part 316 and/or 326 may be used as an antenna which operates in at least one band (e.g., frequency band) predetermined by being electrically connected with a wireless communication circuit included in the electronic device 300.

According to various embodiments, the first rear surface cover 314 and/or the second rear surface cover 324 may be made of, for example, at least one of coated or colored glass, ceramic, a polymer, a metal (e.g., aluminum, stainless steel (STS), or magnesium), or a combination of at least two materials thereof.

According to various embodiments, the flexible display 370 may be disposed to extend from the first surface 311 of the first housing 310 to at least a part of the third surface 321 of the second housing 320 across the hinge module 340. According to an embodiment, the flexible display 370 may substantially include the first region 330*a* corresponding to the first surface 311, a second region 330*b* corresponding to the second surface 312, and a folding area 330*c* connecting the first region 330*a* and the second region 330*b* and corresponding to the hinge module 340. For example, in case that the electronic device 300 is in the unfolded state (e.g., a state of FIG. 3A), the first region 330*a*, the folding area 330*c* and the second region 330*b* of the flexible display 370 may be configured in the same plane, and disposed to be oriented in the same direction. For example, in case that the electronic device 300 is in the folded state (e.g., a state of FIG. 3D), the first region 330*a* and the second region 330*b* of the flexible display 370 may be disposed to face each other while providing a narrow angle therebetween (e.g., about 0-10 degrees) through the folding area 330*c*. For example, the folding area 330*c* may be configured as a curved surface, at least a part of which has predetermined curvature. For example, in case that the electronic device 300 is in the intermediate state, the first region 330*a* and the second region 330*b* of the flexible display 370 may have the angle larger than that of the folded state, and smaller than that of the unfolded state, and curvature of the folding area 330*c* may be smaller than that of the folded state. In another embodiment, the first housing 310 and the second housing 320 may have the angle stoppable at a predetermined folding angle between the unfolded state and the folded state through the hinge module 340 (free stop function).

According to an embodiment, the electronic device 300 may include a first protection cover 315 (e.g., a first protection frame or a first decoration member) coupled along the edge of the first housing 310. According to an embodiment, the electronic device 300 may include a second protection cover 325 (e.g., a second protection frame or a second decoration member) coupled along the edge of the second housing 320. According to an embodiment, the first protection cover 315 and/or the second protection cover 325 may be made of a metal or a polymer material. According to an embodiment, the first protection cover 315 and/or the second protection cover 325 may be used as a decoration member. According to an embodiment, in the flexible display 370, the edge of the first region 330*a* may be positioned to be interposed between the first housing 310 and the first protection cover 315. According to an embodiment, in the flexible display 370, the edge of the second region 330*b* may be positioned to be interposed between the second housing 320 and the second protection cover 325. According to an embodiment, in the flexible display 370, the edge of the flexible display 370 corresponding to a protection cap may be positioned to be protected through a protection cap 335 disposed on an area corresponding to the hinge module 340. Accordingly, the edge of the flexible display 370 may be substantially protected from the outside. According to an embodiment, the electronic device 300 may include a hinge housing 341 (e.g., a hinge cover) disposed to support the hinge module 340, to be exposed to the outside when the electronic device 300 is in the folded state, and to be inserted into the first space (e.g., the inner space of the first housing 310) and the second space (e.g., the inner space of the second housing 320) when the electronic device is the unfolded state, so as not to be seen from the outside.

According to various embodiments, the electronic device 300 may include a sub display 331 disposed separately from the flexible display 310. According to an embodiment, the sub display 331 may be disposed to be at least partially exposed to the second surface 312 of the first housing 310, so as to display state information of the electronic device 300 substituting a display function of the flexible display 370 in case of the folded state. According to an embodiment, the sub display 331 may be disposed to be seen from the outside through at least a part of an area of the first rear surface cover 314. In another embodiment, the sub display 331 may be disposed on the fourth surface 322 of the second housing 320. In this case, the sub display 331 may be disposed to be seen from the outside through at least a part of an area of the second rear surface cover 324.

According to various embodiments, the electronic device 300 may include at least one of an input device 303 (e.g., microphone), acoustic output devices 301, 302, a sensor module 304, camera modules 305, 308, 309, a key input device 306 or a connector port 307. In the embodiment illustrated, the input device 303 (e.g., microphone), the acoustic output devices 301, 302, the sensor module 304, the camera modules 305, 308, 309, the key input device 306 or the connector port 307 may refer to a shape or a hole configured in the first housing 310 or the second housing 320, but may be defined to include a substantial electronic component (e.g., the input device 303, the acoustic output devices 301, 302, the sensor module 304 or the camera modules 305, 308, 309) disposed in the electronic device 300 and operating through the hole or the shape.

According to an embodiment, the camera modules 305, 308, 309 may include the first camera device 305 disposed on the first surface 311 of the first housing 310 of the electronic device 300, the second camera device 308 disposed on the second surface 312 of the first housing 310, and/or a flash 309.

According to various embodiments, a part of the camera module (e.g., the first camera device 305) of the camera modules 305, 308 or a sensor module 304 may be disposed to be exposed through the flexible display 370. For example, the first camera device 305 or the sensor module 304 may be disposed to be in contact with an external environment through an opening (e.g., the through-hole) at least partially configured in the flexible display 370 in the inner space of the electronic device 300. In another embodiment, a part of the sensor module 304 may be disposed to perform a function thereof, without being virtually exposed through the flexible display 370 in the inner space of the electronic device 300. For example, in this case, the opening may be unnecessary for an area of the flexible display 370 facing the sensor module.

According to various embodiments, the electronic device 300 may include an antenna module 380 related to a position estimation of the external device disposed in the second space (e.g., the inner space of the second housing 320) and/or the first space (e.g., the inner space of the first housing 310). According to an embodiment, in the electronic device 300, the antenna module 380 may be disposed in a space (e.g., a second space) different from a space (e.g., a first space) in which the camera devices 305, 308 are disposed. According to an embodiment, in the electronic device 300, the antenna module 380 may be disposed in the space which is the same as the space (e.g., the first space) in which the camera modules 305, 308 are disposed.

According to an embodiment, the antenna module 380 may include a plurality of antennas 380a, 380b and/or 380c for estimating the position of the external device. For example, the electronic device 300 may estimate the distance from and/or the angle (e.g., angle of arrival (AOA)) with respect to the external device by using at least two antennas among the plurality of antennas 380a, 380b and/or 380c included in the antenna module 380.

Figure 4:
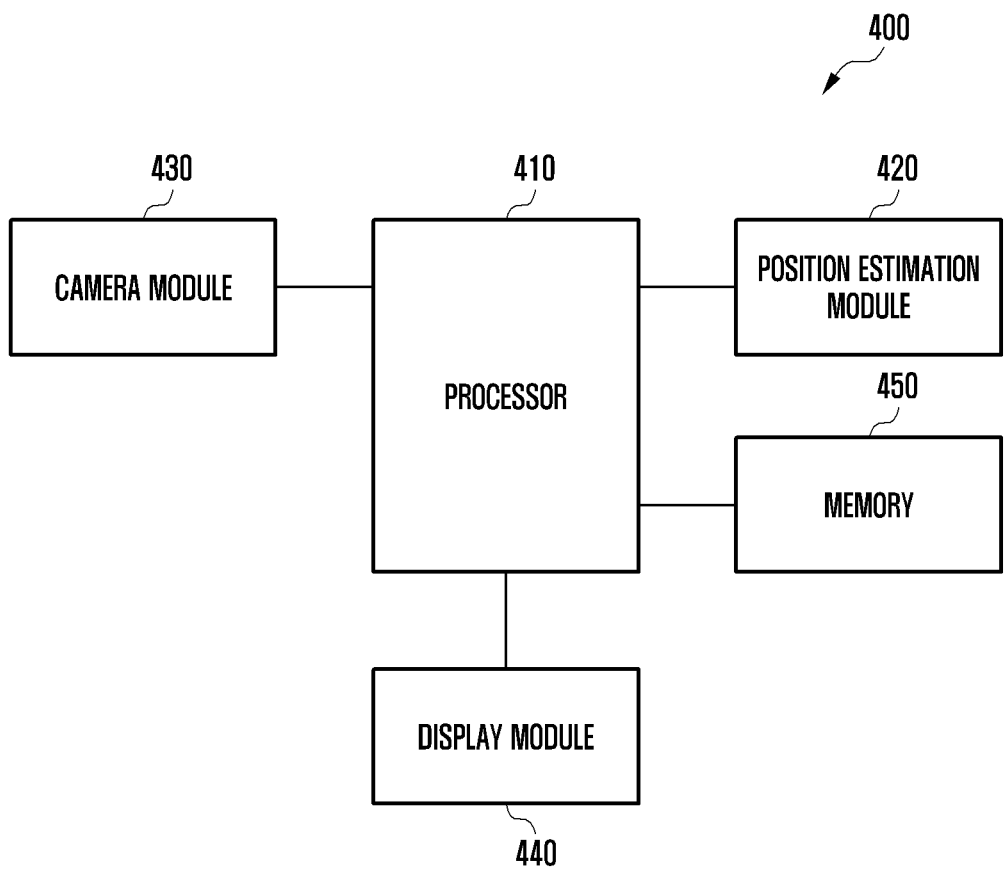
FIG. 4 is a block diagram of an electronic device for correcting a position of an external device according to an embodiment of the disclosure.

FIG. 4 is a block diagram of an electronic device for correcting a position of an external device according to an embodiment of the disclosure. According to an embodiment, the electronic device 400 of FIG. 4 may be at least partially similar to the electronic device 101 of FIG. 1, the electronic device 200 of FIG. 2A or the electronic device 300 of FIG. 3A, or further include other embodiments of the electronic device.

Referring to FIG. 4, according to various embodiments, an electronic device 400 may include a processor (e.g., including processing circuitry) 410, a position estimation module (e.g., including position estimation circuitry or position estimation device) 420, a camera module (e.g., including camera or camera circuitry) 430, a display module (e.g., including display or display circuitry) 440 and/or a memory 450. According to an embodiment, the processor 410 may be substantially equal to the processor 120 of FIG. 1 or may be included in the processor 120. The position estimation module 420 may be substantially equal to the wireless communication module 192 of FIG. 1 or may be included in the wireless communication module 192. The camera module 430 may be substantially equal to the camera module 180 of FIG. 1 or may be included in the camera module 180. The display module 440 may be substantially equal to the display module 160 of FIG. 1 or may be included in the display module 160. The memory 450 may be substantially equal to the memory 130 of FIG. 1 or may be included in the memory 130. According to an embodiment, the processor 410 may be operatively connected to the position estimation module 420, the camera module 430, the display module 440 and/or the memory 450.

According to various embodiments, the position estimation module 420 may estimate the position of the external device (e.g., the electronic device 102 of FIG. 1) by using a first communication method. For example, the first communication method may include an ultra-wideband (UWB) communication method. According to an embodiment, the electronic device 400 may establish a communication channel (e.g., session) with the external device (e.g., the electronic device 102 of FIG. 1). For example, the position estimation module 420 may establish a communication channel with the external device discovered based on UWB communication through the UWB communication method. In another embodiment, the electronic device 400 may perform a discovery procedure by using a second communication method different from the first communication method (e.g., the UWB communication method). The electronic device 400 may establish a communication channel with the external device in the position estimation module

420 by the first communication method (e.g., the UWB communication method) when the external device is discovered through the discovery procedure. For example, the position estimation module 420 may be activated when the external device is discovered, based on the second communication method. For example, the second communication method may include a Bluetooth, a Bluetooth low energy (BLE), a wireless LAN (e.g., Wi-Fi) and/or a neighborhood area network (NAN) communication.

According to an embodiment, the position estimation module 420 may measure (or estimate) the distance between the external device and the electronic device 400, based on a difference between a time point of receiving a response signal (e.g., ranging response signal) from the external device and a time point of transmitting a signal (e.g., ranging request signal) to the external device, in order to measure the distance from the external device (e.g., the electronic device 102 of FIG. 1). For example, the position estimation module 420 may transmit and/or receive a signal through a communication channel established with the external device. According to an embodiment, the position estimation module 420 may transmit a signal (e.g., ranging request signal) related to a virtual object to the external device, and may receive a response signal (e.g., ranging response signal) from the external device. For example, the response signal may include a header and a payload. For example, the header may include type (e.g., message type) information related to the response signal. For example, the payload may include additional information (e.g., user information of the electronic device 400, state information of the electronic device 400, and virtual object information) related to the response signal. For example, the virtual object information may include at least one of a text, an image, or a video.

According to an embodiment, the position estimation module 420 may measure (or estimate) the angle (e.g., AoA) of the external device, based on a phase difference of a signal received from the external device through at least two antennas (e.g., antenna 230a, 230b and/or 230c of FIG. 2B). For example, the position estimation module 420 may estimate a two-dimensional angle (e.g., AoA) of the external device, based on the phase difference of the signal received from the external device through the first antenna 230a and the second antenna 230b or the second antenna 230b and the third antenna 230c. For example, the position estimation module 420 may estimate a three-dimensional position of the external device, based on a first angle (e.g., AoA) of the external device estimated through the second antenna 230b and the first antenna 230a at a first time point, and a second angle (e.g., AoA) of the external device estimated through the third antenna 230a and the second antenna 230b at a second time point. In another embodiment, the position estimation module 420 may estimate a three-dimensional position of the external device by activating the first antenna 230a, the second antenna 230b and the third antenna 230c, at the same time.

According to various embodiments, the camera module 430 may photograph a still image and/or a video. According to an embodiment, the camera module 430 may include a plurality of camera devices (e.g., the second camera device 212 of FIG. 2A) disposed on the second surface (e.g., the second surface 210B of FIG. 2B) oriented in a direction opposite to the first surface (e.g., the first surface 210A of FIG. 2A) of the electronic device 400. For example, the plurality of camera devices may include a first camera (e.g., a wide angle camera), a second camera (e.g., a telephoto camera), and a third camera (e.g., a super-wide-angle camera) which include different angles of view. According to an embodiment, the camera module 430 may include at least one camera device (e.g., the first camera device 205 of FIG. 2A) disposed on the first surface (e.g., the first surface 210A of FIG. 2A) of the electronic device 400. For example, the camera module 430 may include one or more lenses or image sensors.

According to various embodiments, the processor 410 may correct position information of the external device (or an external object) acquired through the position estimation module 420 to correspond to an arrangement position of the camera module 430 (e.g., the first camera). According to an embodiment, the processor 410 may correct position information of the external device (or the external object) acquired through the position estimation module 420 to correspond to the arrangement position of the camera module 430 (e.g., the first camera), based on the distance between the position estimation module 420 and the camera module 430 (e.g., the first camera). For example, the corrected position of the external device may be acquired based on the distance from the external device and the angle with respect to the external device acquired through the position estimation module 420, and the distance between the position estimation module 420 and the camera module 430 (e.g., the first camera). For example, the distance between the position estimation module 420 and the camera module 430 (e.g., the first camera) may include the distance between a central axis of the position estimation module 420 and a central axis of the camera module 430. For example, the central axis of the position estimation module 420 may include a central axis of a range for estimating the position of the external device by the position estimation module 420. For example, the central axis for estimating the position of the external device by the position estimation module 420 may include the central axes of the antennas used for estimating the position of the external device. For example, the central axis of the camera module 430 may include a central axis of a view angle of the camera module 430 (e.g., the first camera). For example, the distance between the position estimation module 420 and the camera module 430 (e.g., the first camera) may be configured based on a camera (e.g., the first camera or the second camera) activated for collecting image information, antennas used for estimating the position of the external device by the position estimation module 420, or orientation of the electronic device 400.

According to various embodiments, the processor 410 may provide at least one function, based on corrected position information of the external device. According to an embodiment, the processor 410 may control the display module 440, in order to display image information (e.g., preview image) acquired through the camera module 430. The processor 410 may control the display module 440, in order to display at least one virtual object on at least a part corresponding to the corrected position information of the external device, among the image information (e.g., preview image) displayed on the display module 440. For example, the virtual object may include information related to the external device on which the virtual object is displayed or information related to an application executed in the electronic device 400.

According to an embodiment, the processor 410 may control the display module 440, in order to display image information (e.g., preview image) acquired through the camera module 430. The processor 410 may detect an input with respect to at least a part of the image information displayed on the display module 440. The processor 410 may identify the external device corresponding to an area in which the input is detected in the image information displayed on the display module 440, based on the corrected position information of the external device. The processor 410 may provide a data sharing function with the external device corresponding to the area in which the input is detected. For example, the processor 410 may convert an image (e.g., video or image) acquired through the camera module 430 to correspond to an image transmission method (e.g., Bluetooth (BT), Wi-Fi-direct, or cellular network), and then transmit the same to the external device corresponding to the area in which the input is detected.

According to various embodiments, the processor 410 may correct position information of the external device acquired through the position estimation module 420, in order to correspond to the arrangement position of the activated camera module 430, based on a switching of the camera module 430. For example, the switching of the camera module 430 may include a series of operations by which a camera activated for acquiring image information, among a plurality of cameras included in the camera module 430, is switched. According to an embodiment, the distance between the position estimation module 420 and the camera module 430 may be changed by the difference of the positions in which the first camera and the second camera are disposed in the inner space of the electronic device 400 when the camera module 430 for acquiring image information switches to the second camera (e.g., a telephoto camera) from the first camera (e.g., a wide angle camera). Accordingly, the processor 410 may correct the position information of the external device acquired through the position estimation module 420 to correspond to the arrangement position of the camera module 430 (e.g., the second camera), based on the changed distance between the position estimation module 420 and the camera module 430 (e.g., the second camera) by the switching of the camera module 430. For example, the processor 410 may correct the position information of the external device acquired through the position estimation module 420 to correspond to the arrangement position of the camera module 430 (e.g., the second camera), based on the switching of the camera module 430 in a state in which the positions of the electronic device 400 and the external device are maintained while providing at least one function, based on the corrected position information of the external device.

According to various embodiments, the processor 410 may correct position information of the external device acquired through the position estimation module 410 to correspond to the arrangement position of the camera module 430, based on a direction switching of the camera module 430. According to an embodiment, the distance between the position estimation module 420 and the camera module 430 may be changed by a change of a central axis of the view angle of the camera module 430 and/or the central axis for estimating the position of the external device by the position estimation module 420, when the direction of the electronic device 400 is switched (e.g., switching the direction from the horizontal direction to the vertical direction). Accordingly, the processor 410 may correct the position information of the external device acquired through the position estimation module 420 to correspond to the arrangement position of the camera module 430 (e.g., the second camera), based on the distance between the position estimation module 420 and the camera module 430 (e.g., the second camera) changed by the direction switching of the electronic device 400. For example, the processor 410 may correct the position information of the external device acquired through the position estimation module 420 to correspond to the arrangement position of the camera module 430 (e.g., the second camera), based on the direction switching of the electronic device 400 in a state in which the positions of the electronic device 400 and the external device are maintained while providing at least one function, based on the corrected position information of the external device.

According to various embodiments, the processor 410 may correct position information of the external device acquired through the position estimation module 420, based on an angle variation between the central axis of the camera module 430 and the central axis of the position estimation module 420 by an optical zoom of the camera module 430. According to an embodiment, the processor 410 may detect an angle variation of the central axis of the camera module 430 and the central axis of the position estimation module 420 by the optical zoom applied through the camera module 430. The processor 410 may correct position information of the external device acquired through the position estimation module 420 to correspond to the arrangement position of the camera module 430 (e.g., the first camera) when the angle variation between the central axis of the position estimation module 420 and the central axis of the camera module 430 satisfies a predetermined first condition. For example, the processor 410 may correct the position information of the external device acquired through the position estimation module 420 to correspond to the arrangement position of the camera module 430 (e.g., the first camera), based on the distance between the position estimation module 420 and the camera module 430 (e.g., the first camera) and/or the angle of the central axis of the position estimation module 420 and the central axis of the camera module 430. For example, the processor 410 may correct the position information of the external device acquired through the position estimation module 420 to correspond to a magnification of the optical zoom and/or the arrangement position of the camera module 430 (e.g., the second camera), based on a change of the magnification of the optical zoom in a state wherein the positions of the external device and the electronic device 400 are maintained while providing at least one function, based on the corrected position information of the external device.

According to various embodiments, the processor 410 may correct position information of the external device acquired through the position estimation module 420, based on the folding angle of a pair of housings when the position estimation module 420 and the camera module 430 are included in a pair of housings (e.g., the first housing 310 or the second housing 320 of FIG. 3A) rotatably coupled to be folded to face each other with reference to the hinge module (e.g., the hinge module 340 of FIG. 3B). According to an embodiment, the processor 410 may correct the position information of the external device acquired through the position estimation module 420 to correspond to the arrangement position of the camera module 430 (e.g., the first camera) when the folding angle of the first housing (e.g., the first housing 310 of FIG. 3A) in which the position estimation module 420 is disposed and the second housing (e.g., the second housing 320 of FIG. 3A) in which the camera module 430 is disposed satisfies a predetermined second angle. For example, the processor 410 may correct the position information of the external device acquired through the position estimation module 420 to correspond to the arrangement position of the camera module 430 (e.g., the first camera), based on the folding angle and/or the distance between the camera module 430 (e.g., the first camera) and the position estimation module 420.

According to an embodiment, the processor 410 may detect an angle variation of the folding angle when the folding angle of the electronic device 400 is changed. The processor 410 may correct position information of the external device acquired through the position estimation module 420 to correspond to the arrangement position of the camera module 430 (e.g., the first camera), based on a changed folding angle and/or the distance between the camera module 430 (e.g., the first camera) and the position estimation module 420 when the folding angle satisfies a predetermined second condition, and the folding variation satisfies a predetermined third condition. For example, the processor 410 may correct the position information of the external device acquired through the position estimation module 420 to correspond to the folding angle and/or the arrangement position of the camera module 430 (e.g., the second camera), based on a change of the folding angle in a state in which the positions of the external device and the electronic device 400 are maintained while providing at least one function, based on the corrected position information of the external device.

According to various embodiments, the processor 410 may control the display module 440 to change a shape (e.g., characteristic) of a virtual object, based on the switching of the camera module 430. For example, the shape of the virtual object may include a size, color, shape, brightness, and/or transparency of the object.

According to various embodiments, the processor 410 may control the display module 440 to display information related to a state of the electronic device 400. For example, state information of the electronic device 400 may include the folding angle (e.g., the unfolded state, the folded state, the intermediate state) and/or orientation (e.g., the horizontal direction (landscape) or the vertical direction (portrait)) of the electronic device 400.

According to various embodiments, the display module 440 may display information processed in the electronic device 400. According to various embodiments, the display module 440 may display the image information (e.g., preview image) acquired through the camera module 430. According to an embodiment, the display module 440 may display at least one virtual object, based on position information of the external device, corrected by the processor 410. For example, at least one virtual object may be displayed to overlap at least a part of image information acquired through the camera module 430, based on the position information of the external device, corrected by the processor 410. According to an embodiment, the display module 440 may change the shape (e.g., characteristic) of the virtual object, based on the switching of the camera module 430. According to an embodiment, the display module 440 may display information related to a state of the electronic device 400 so that a user of the electronic device 400 recognizes state information of the electronic device 400.

According to various embodiments, the memory 450 may store various data used by at least one component (e.g., the processor 410, the position estimation module 420, the camera module 430 or the display module 440) of the electronic device 400. For example, the data may include information related to the distance between the camera module 430 and the position estimation module 420 corresponding to the direction of the electronic device 400, the predetermined first condition, the predetermined second condition, and/or the predetermined third condition. For example, the data may include input data or output data with regard to software and commends related thereto. According to an embodiment, the memory 450 may store various instructions to be executed through the processor 410.

According to various embodiments, the electronic device (e.g., the electronic device 101 of FIG. 1, the electronic device 200 of FIG. 2A, the electronic device 300 of FIG. 3A or the electronic device 400 of FIG. 4) may include the housing (e.g., the housing 210 of FIG. 2A or the first housing 310 or the second housing 320 of FIG. 3A), the first camera module (e.g., the camera module 180 of FIG. 1, the second camera device 212 of FIG. 2A, the second camera device 308 of FIG. 3C or the camera module 430 of FIG. 4) disposed in the first region of the inner space of the housing, the position estimation module (e.g., the wireless communication module 192 of FIG. 1, the antenna module 230 of FIG. 2A, the antenna module 380 of FIG. 3C or the position estimation module 420 of FIG. 4) disposed in the second area different from the first region of the inner space, and the processor (e.g., the processor 120 of FIG. 1 or the processor 410 of FIG. 4) operatively connected to the first camera module and the position estimation module, wherein the processor may identify the first distance between the first camera module and the position estimation module, estimate the position of the external device through the position estimation module, and correct the position of the object related to the external device in image information acquired through the first camera module, based on the first distance and the estimated position of the external device.

According to various embodiments, the position estimation module may include the ultra-wideband (UWB) module.

According to various embodiments, the first distance includes the distance between the central axis of the view angle of the first camera module and the central axis of the range for estimating the position of the external device by the position estimation module.

According to various embodiments, the electronic device may further include the plurality of antennas usable for estimating the position of the external device by the position estimation module, wherein the central axis of the range for estimating the position of the external device by the position estimation module includes the central axes of at least two antennas used for estimating the position of the external device, among the plurality of antennas.

According to various embodiments, the first distance may include the distance between the central axis of the view angle of the first camera module corresponding to orientation of the electronic device and the central axis of the range for estimating the position of the external device by the position estimation module.

According to various embodiments, the processor may correct the position of the object related to the external device in image information acquired through the first camera module, based on the distance up to the external device estimated through the position estimation module, the angle between the electronic device and the external device, and the first distance.

According to various embodiments, the electronic device may further include the display module (e.g., the display module 160 of FIG. 1, the display 201 of FIG. 2A, the flexible display 370 of FIG. 3A or the display module 440 of FIG. 4), wherein the processor may display image information acquired through the first camera module on at least a part of the display module, and display at least one virtual object on at least a part of the image information displayed on the display module, based on the corrected position of the object related to the external device.

According to various embodiments, the at least one virtual object may include information related to the application executed in the electronic device or related to the external device.

According to various embodiments, the processor may identify angle variations of the central axis of the position estimation module and the central axis of the first camera module, based on the change of the optical zoom when the optical zoom of the first camera module is applied, and correct the position of the object related to the external device in the image information acquired through the first camera module, based on the change of the optical zoom when the angle variation satisfies a predetermined condition.

According to various embodiments, the electronic device may further include the second camera module (e.g., the camera module 180 of FIG. 1, the second camera device 212 of FIG. 2A, the second camera device 308 of FIG. 3C or the camera module 430 of FIG. 4) disposed in the third region different from the first region and the second region in the inner space, wherein the processor may identify the second distance based on the positions in which the second camera module and the position estimation module are disposed when the activated camera is switched from the first camera module to the second camera module, and correct the position of the object related to the external device in the image information acquired through the second camera module, based on the second distance and the estimated position of the external device.

Figure 5:
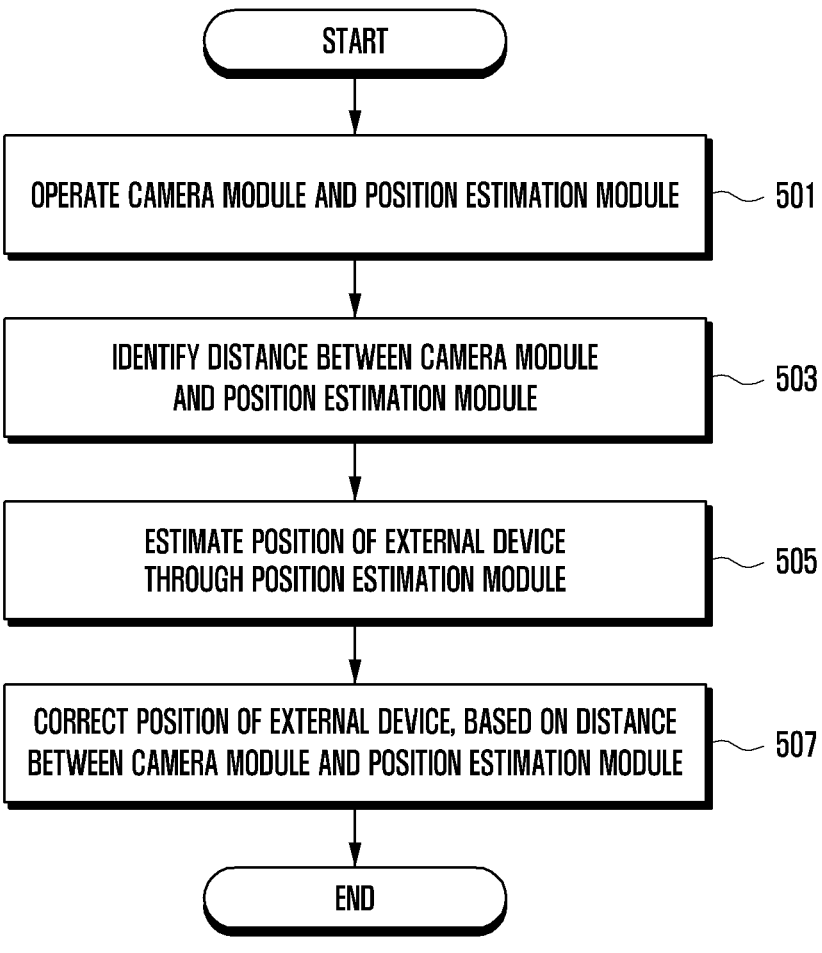
FIG. 5 is a flowchart for correcting a position of an external device in an electronic device according to an embodiment of the disclosure.

FIG. 5 is a flowchart for correcting a position of an external device in an electronic device according to an embodiment of the disclosure.

Hereinafter, in an embodiment, operations may be sequentially performed, but are not always sequentially performed. For example, the order of the operations may be switched, and at least two operations may be performed in parallel. For example, the electronic device of FIG. 5 may be the electronic device 101 of FIG. 1, the electronic device 200 of FIG. 2A, the electronic device 300 of FIG. 3A or the electronic device 400 of FIG. 4. For example, at least a part of components of FIG. 5 may be described by referring to FIGS. 6A, 6B, and 7.

Figure 6A:
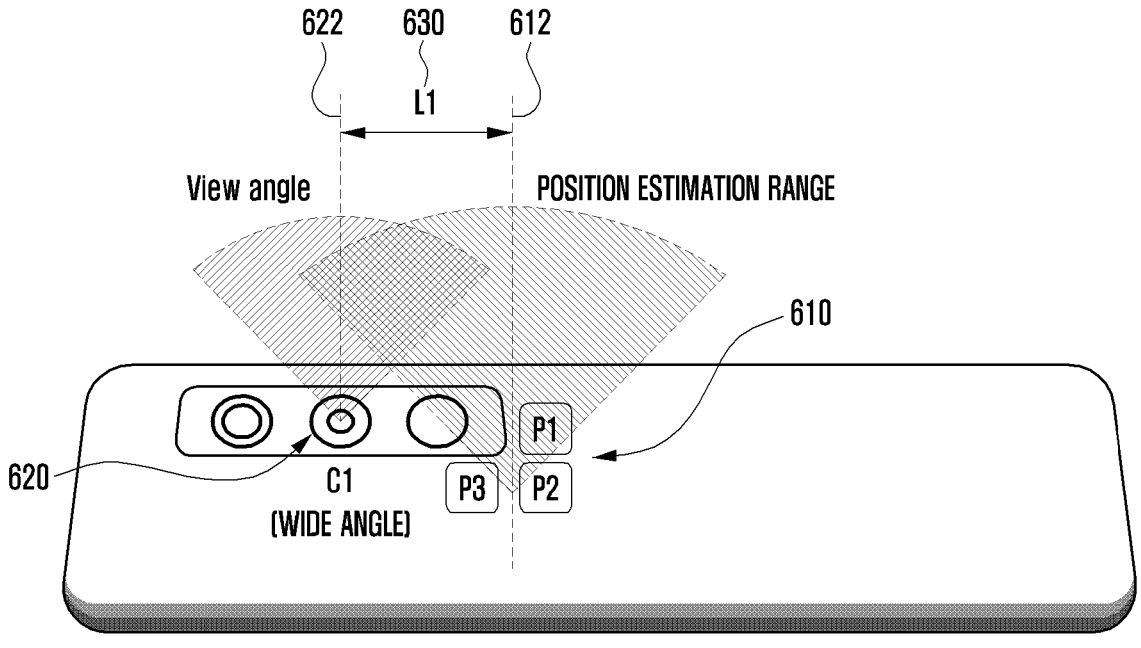
FIGS. 6A and 6B illustrate examples for indicating an object related to an external device in image information acquired through a camera module in an electronic device according to various embodiments of the disclosure.
Figure 6B:
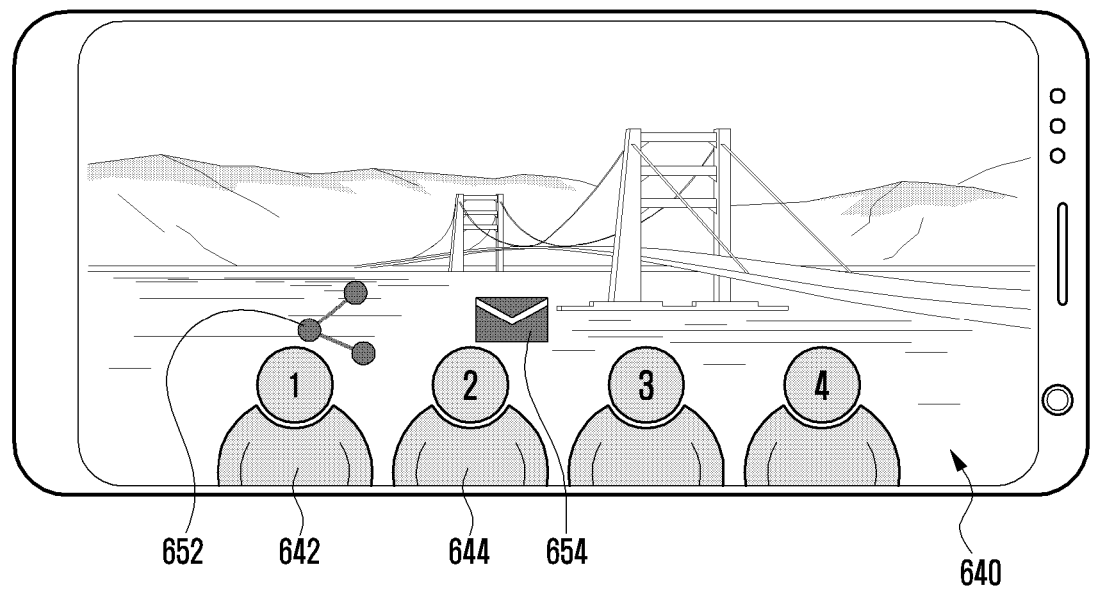
Figure 7:
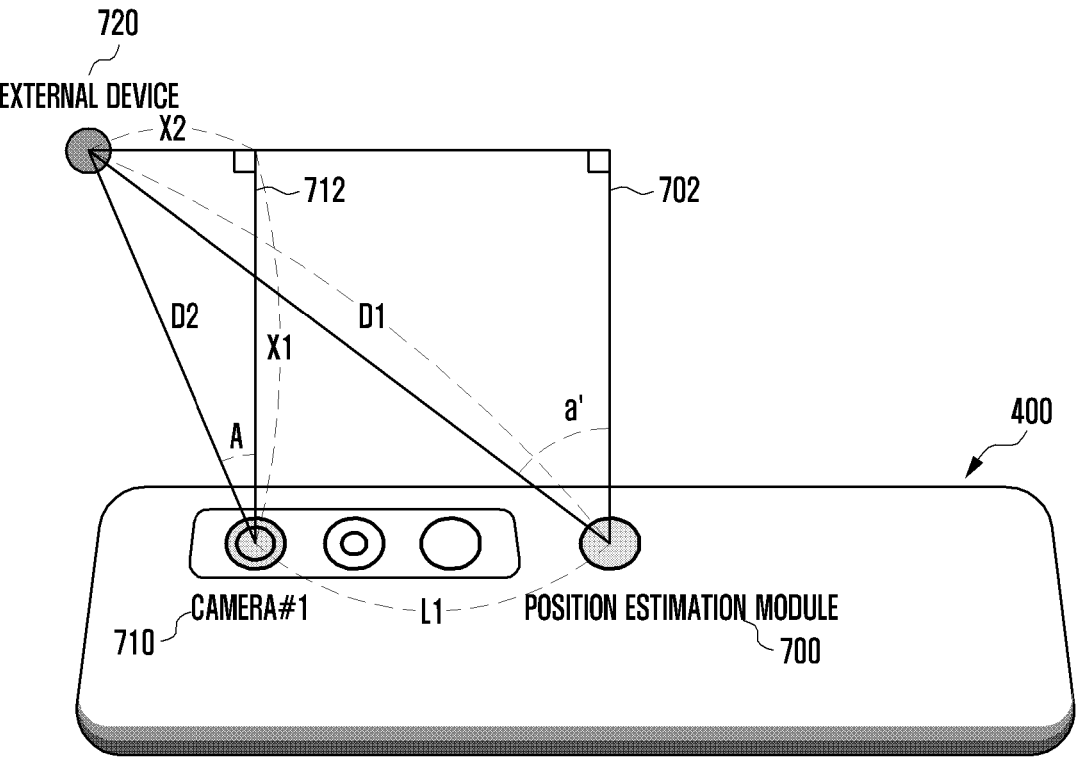
FIG. 7 illustrates an example for correcting a position of an object related to an external device in image information acquired through a camera module in an electronic device according to an embodiment of the disclosure.

FIGS. 6A and 6B illustrate examples for indicating an object related to an external device in image information acquired through a camera module in an electronic device according to various embodiments of the disclosure. FIG. 7 illustrates an example for correcting a position of an object related to an external device in image information acquired through a camera module in an electronic device according to an embodiment of the disclosure.

Referring to FIG. 5, according to various embodiments, the electronic device (e.g., the processor 120 of FIG. 1 or the processor 410 of FIG. 4) may operate a position estimation module (e.g., the position estimation module 420 of FIG. 4) and/or a camera module (e.g., the camera module 430 of FIG. 4) related to a function (e.g., augmented reality function) executed in the electronic device (e.g., the electronic device 400 of FIG. 4), in operation 501. According to an embodiment, the processor 410 may perform control to operate the position estimation module 420 and/or the camera module 430 related to execution of an augmented reality application when the augmented reality application is executed based on a user input.

According to various embodiments, the electronic device (e.g., the processor 120 or 410) may identify the distance between the position estimation module (e.g., the position estimation module 420 of FIG. 4) and the camera module (e.g., the camera module 430 of FIG. 4), in operation 503.

According to an embodiment, the processor 410 may acquire information related to the distance between the position estimation module 420 and the camera module 430 from the memory 450. For example, the distance between the position estimation module 420 and the camera module 430 may include a distance L1 630 between a central axis 612 of the position estimation module 420 and a central axis 622 of the camera module 430, as illustrated in FIG. 6A. For example, the central axis of the position estimation module 420 may be a central axis of a range for estimating the position of the external device by the position estimation module 420, and include the central axes of antennas 610 (e.g., the second antenna P2 and the third antenna P3) used for estimating the position of the external device. For example, the central axis of the camera module 430 may include a central axis of a view angle of the activated camera 620 among the plurality of cameras included in the camera module 430. For example, the distance between the position estimation module 420 and the camera module 430 (e.g., the first camera) may be configured based on a camera (e.g., the first camera or the second camera) activated to collect image information, antennas used for estimating the position of the external device by the position estimation module 420, or orientation of the electronic device 400.

According to various embodiments, the electronic device (e.g., the processor 120 or 410 or the position estimation module 420) may estimate the position of the external device through the position estimation module (e.g., the position estimation module 420 of FIG. 4), in operation 505. For example, the position of the external device may include the distance between the electronic device 400 and the external device and/or the angle at a point in which the external device is positioned from the electronic device 400 (e.g., AoA). According to an embodiment, the position estimation module 420 may measure the distance between the electronic device 400 and the external device, based on a difference between a time point of receiving a response signal (e.g., ranging response signal) from the external device and a time point of transmitting a signal (e.g., ranging request signal) to the external device, through a communication channel established with the external device (e.g., the electronic device 102 of FIG. 1). According to an embodiment, the position estimation module 420 may estimate the angle with respect to the external device (e.g., angle of arrival (AOA)), based on a phase difference of the signal received from the external device through at least two antennas (e.g., the second antenna P2 and the third antenna P3). For example, the communication channel may be established through a first communication method (e.g., UWB communication method).

According to various embodiments, the electronic device (e.g., the processor 120 or 410) may correct the position of the external device acquired through the position estimated module, based on the distance between the position estimation module (e.g., the position estimation module 420 of FIG. 4) and the camera module (e.g., the camera module 430 of FIG. 4), in operation 507. According to an embodiment, the position information of the external device acquired through the position estimation module 420 may be corrected to correspond to the arrangement position of the camera module 430, based on the distance between the position estimation module 420 and the camera module 430. For example, referring to FIG. 7, the processor 410 may identify the distance from an external device 720 acquired through the position estimation module 700 (e.g., the position estimation module 420) as D1, and the angle with respect to the external device 720 as a'. The processor 410 may calculate the distance D2 from and the angle A with the external device 720 corresponding to the position of a first camera 710 (e.g., the camera module 430), based on the distance L1 between the position estimation module 700 and the first camera 710 (e.g., the camera module 430). For example, the corrected angle A with the external device 720 may be calculated based on Equation 1.

$$A = \arctan(X2/X1)$$

$$X1 = D1 \times \cos(90 - a')$$

$$X2 = D1 \times \cos(a') - L1 \qquad \text{Equation 1}$$

For example, A may represent the angle with respect to the external device 720, corrected to correspond to an arrangement position of the first camera 710 (e.g., the camera module 430), D1 may represent the distance from the external device 720 acquired through the position estimation module 700 (e.g., the position estimation module 420), a' may represent the angle with respect to the external device 720 acquired through the position estimation module 700 (e.g., the position estimation module 420), and L1 may represent the distance between the central axis 702 of the position estimation module 700 and the central axis 712 of the first camera 710 (e.g., the camera module 430).

For example, the corrected distance D2 with the external device 720 may be calculated based on Equation 2.

$$D2 = \sqrt{X1^2 + X2^2} \qquad \text{Equation 2}$$

For example, D2 may represent the distance from the external device 720, corrected to correspond to the arrangement position of the first camera 710 (e.g., the camera module 430).

According to various embodiments, the electronic device (e.g., the processor 120 or 410) may display at least one virtual object, based on the position information of the external device corrected to correspond to the arrangement position of the camera module 430 when executing an augmented reality function. According to an embodiment, the processor 410 may estimate the positions of the first external device 642 and the second external device 644 through the position estimation module 420, referring to FIG. 6B. The processor 410 may correct the positions of the first external device 642 and the second external device 644 to correspond to the arrangement position of the camera module 430, based on the distance between the position estimation module 420 and the camera module 430. The processor 410 may control the display module 640 to display the first virtual object 652 and the second virtual object 654 on at least a part of the image information (e.g., preview image) acquired through the camera module 430 (e.g., the first camera 620), based on the corrected position of the first external device 642 and the second external device 644. For example, the processor 410 may correct the position information of the external device acquired through the position estimation module 420 to correspond to the image information acquired through the camera module 430, based on the distance between the position estimation module 420 and the camera module 430. For example, the first virtual object 652 and/or the second virtual object 654 may include information related to the external device (e.g., the first external device 642 and/or the second external device 644) and/or information related to an application executed in the electronic device 400.

Figure 8:
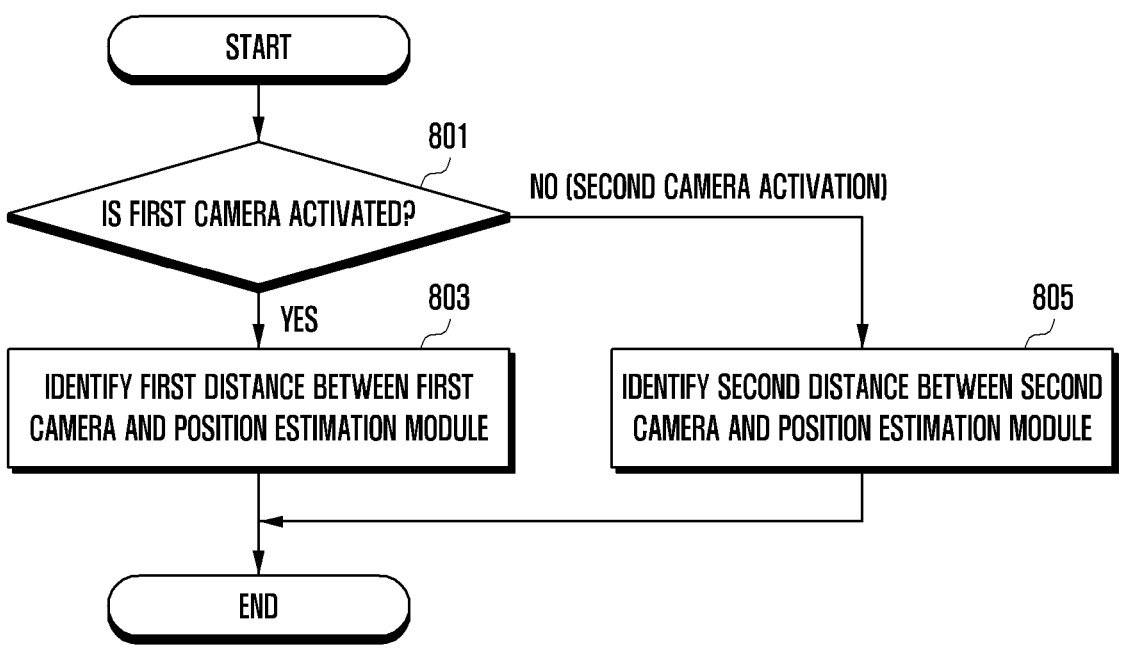
FIG. 8 is a flowchart for identifying the distance between a camera module and a position estimation module in an electronic device according to an embodiment of the disclosure.

FIG. 8 is a flowchart for identifying a distance between a camera module and a position estimation module in an electronic device according to an embodiment of the disclosure.

According to an embodiment, operations of FIG. 8 may be operations in detail of operation 503 of FIG. 5. Hereinafter, in an embodiment, the operations may be sequentially performed, but are not always sequentially performed. For example, the order of the operations may be switched, and at least two operations may be performed in parallel. For example, the electronic device of FIG. 8 may be the electronic device 101 of FIG. 1, the electronic device 200 of FIG. 2A, the electronic device 300 of FIG. 3A or the electronic device 400 of FIG. 4. For example, at least a part of components of FIG. 8 may be described by referring to FIG. 9.

Figure 9:
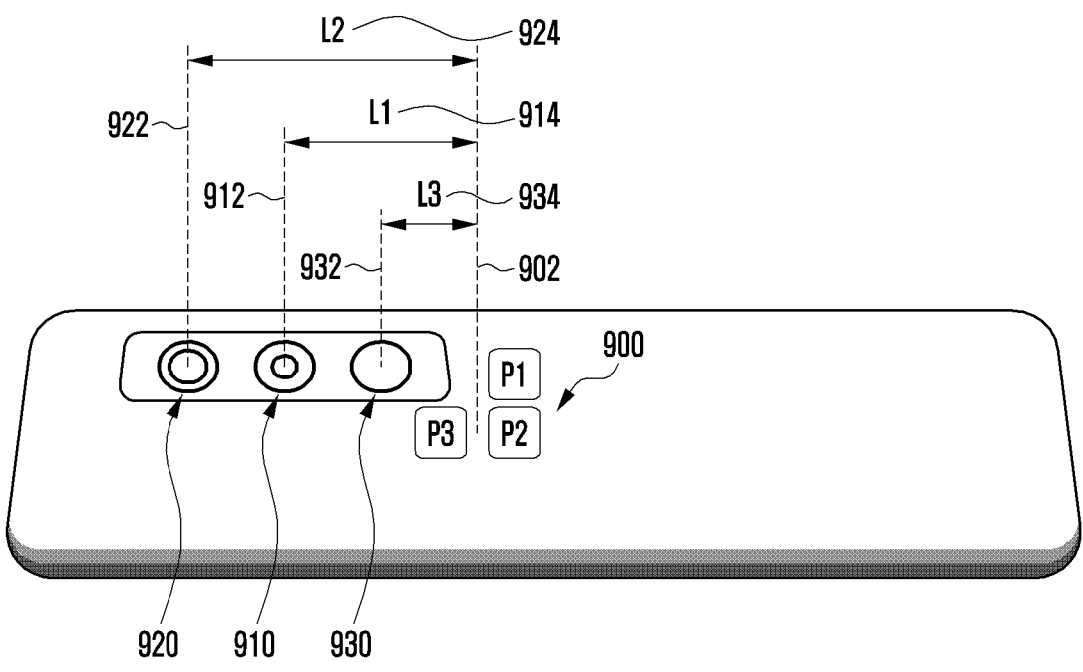
FIG. 9 is an example illustrating the distance between a camera module and a position estimation module in an electronic device according to an embodiment of the disclosure.

FIG. 9 is an example illustrating a distance between a camera module and a position estimation module in an electronic device according to an embodiment of the disclosure.

Referring to FIG. 8, according to various embodiments, the electronic device (e.g., the processor 120 of FIG. 1 or the processor 410 of FIG. 4) may identify whether a first camera is activated to acquire image information, among a plurality of cameras included in the camera module (e.g., the camera module 430), in operation 801. According to an embodiment, the camera module 430 may include a plurality of cameras 910, 920 and/or 930 as illustrated in FIG. 9. For example, the processor 410 may identify whether the first camera 910 among the plurality of cameras 910, 920 and/or 930 is activated. For example, the plurality of cameras 910, 920 and/or 930 may support different angles of view, and may be disposed in different positions. For example, the first camera 910 (e.g., a wide angle camera) may support the view angle having a first size. The second camera 920 (e.g., a telephoto camera) may support the view angle having a second size which is relatively smaller than the first size. The third camera 930 (e.g., a super wide angle camera) may support the view angle having a third size which is relatively larger than the first size.

According to various embodiments, the electronic device (e.g., the processor 120 or 410) may identify the first distance between the first camera and the position estimation module, in operation 803, when the first camera is activated (e.g., Yes in operation 801), in order to acquire image information among the plurality of cameras included in the camera module (e.g., the camera module 430). According to an embodiment, the processor 410 may identify a distance L1 914 between a central axis 902 of the position estimation module 420 and a central axis 912 of the first camera 910 stored in the memory 450 when the first camera 910 is activated in order to acquire the image information. For example, the central axis 902 of the position estimation module 420 may be a central axis of a range for estimating the position of the external device by the position estimation module 420, may include a central axis of the antennas 900 (e.g., the second antenna P2 and the third antenna P3) used for estimating the position of the external device.

According to various embodiments, the electronic device (e.g., the processor 120 or 410) may identify a second distance between the other camera (e.g., a second camera or a third camera) and the position estimation module, in operation 805, when the other camera (e.g., the second camera or the third camera) rather than the first camera is activated (e.g., No in operation 801), in order to acquire the image information among the plurality of cameras included in the camera module (e.g., a camera module 430). According to an embodiment, the processor 410 may identify a distance L2 924 between the central axis 902 of the position estimation module 420 and a central axis 922 of the second camera 920 stored in the memory 450 when the second camera 920 is activated in order to acquire the image information. According to an embodiment, the processor 410 may identify a distance L3 934 between the central axis 902 of the position estimation module 420 and a central axis 932 of the third camera 930 stored in the memory 450 when the third camera 930 is activated in order to acquire the image information.

According to various embodiments, the electronic device (e.g., the processor 120 or 410) may correct again the position information of the external device (or external object) acquired through the position estimation module 420 to correspond to an arrangement position of the switched camera module 430, based on the switching of the camera module 430. According to an embodiment, referring to FIG. 9, when the camera activated for acquiring the image information is switched to the second camera 920 from the first camera 910, the larger the distance between the camera 910 or 920 and the antennas 900 (e.g., the position estimation module) becomes, the larger the position estimation error of the external device may be. For example, the position estimation error of a virtual object between the first camera 910 and the antennas 900 (e.g., the position estimation module) may include about 1.66 degrees when it is assumed that the distance between the first camera 910 and the antennas 900 (e.g., the position estimation module) is about 3 cm and the view angle of the first camera 910 is about 120 degrees. The position estimation error of the virtual object between the second camera 920 and the antennas 900 (e.g., the position estimation module) may be about 2.63 degrees which may be larger than about 1.57 times than the case of the first camera 910 when it is assumed that the distance between the second camera 920 and the antennas 900 (e.g., the position estimation module) is about 6 cm and the view angle of the second camera 920 is about 76 degrees. Therefore, the processor 410 may correct again the position information of the external device acquired through the position estimation module 420 to correspond to an arrangement position of the second camera 920, based on the switching from the first camera 910 to the second camera 920. According to an embodiment, the processor 410 may provide at least one function (e.g., augmented reality function), based on the position information of the external device corrected by the operations 501 to 507 in FIG. 5. The processor 410 may correct again the position information of the external device acquired through the position estimation module 420 to correspond to the arrangement position of the switched camera module 430 when the camera module 430 is switched in a state in which the positions of the external device and the electronic device 400 are maintained while providing at least one function. For example, the switching of the camera module 430 may include a series of operations by which the camera activated for acquiring the image information, among the plurality of cameras included in the camera module 430, is switched. According to an embodiment, the electronic device 400 may determine the central axes of the activated camera devices as the central axis of the camera module 430 when there is the plurality of the activated cameras among the plurality of cameras included in the camera module 430.

According to another embodiment, the position estimation error of the external device may relatively increase as a difference of the view angle of the camera module 430 is increasing or the optical zoom is configured to be large. For example, the position estimation error of the virtual object between the second camera 920 and the antennas 900 (e.g., the position estimation module) may be about 7.98 degrees which is about 3 times larger than the case that the optical zoom is not applied, when 3-multiple optical zoom is applied to the second camera 920. Accordingly, the processor 410 may correct again the position information of the external device acquired through the position estimation module 420, based on the view angle change of or the optical zoom application to the camera module 430.

Figure 10:
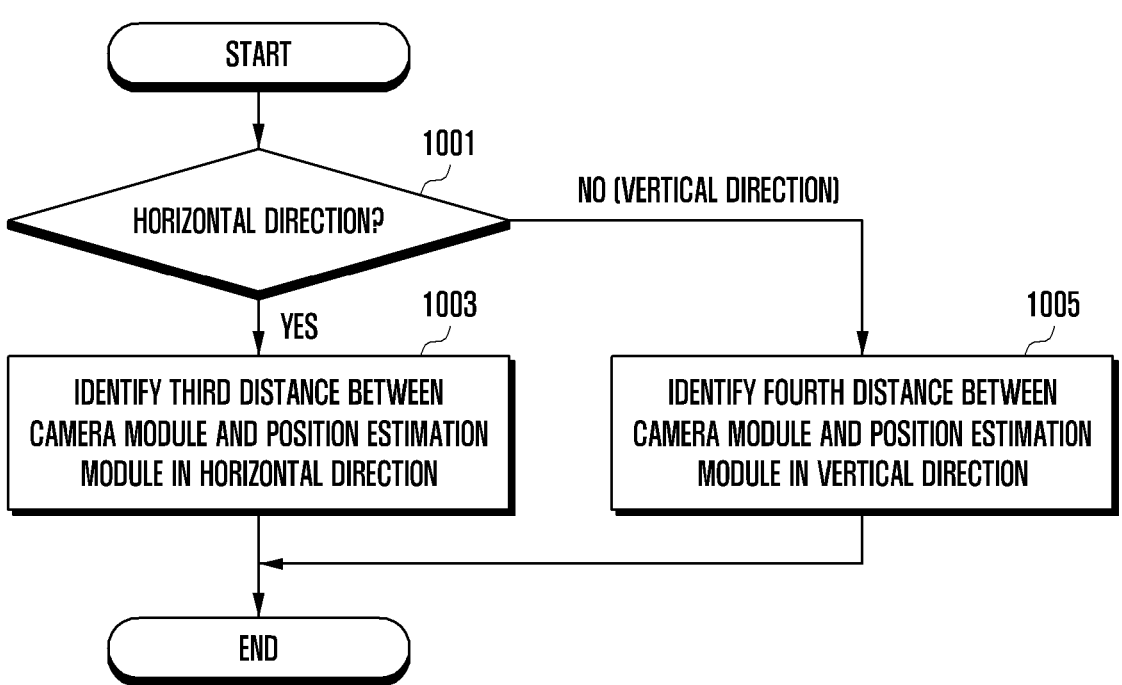
FIG. 10 is a flowchart for identifying the distance between a camera module and a position estimation module, based on an operation state of an electronic device by the electronic device according to an embodiment of the disclosure.

FIG. 10 is a flowchart for identifying a distance between a camera module and a position estimation module, based on an operation state of an electronic device, by the electronic device according to an embodiment of the disclosure.

According to an embodiment, operations of FIG. 10 may be operations in detail of operation 503 of FIG. 5. Hereinafter, in an embodiment, the operations may be sequentially performed, but are not always sequentially performed. For example, the order of the operations may be switched, and at least two operations may be performed in parallel. For example, the electronic device of FIG. 10 may be the electronic device 101 of FIG. 1, the electronic device 200 of FIG. 2A, the electronic device 300 of FIG. 3A or the electronic device 400 of FIG. 4. For example, at least a part of components of FIG. 10 may be described by referring to FIGS. 11A and 11B.

Figure 11A:
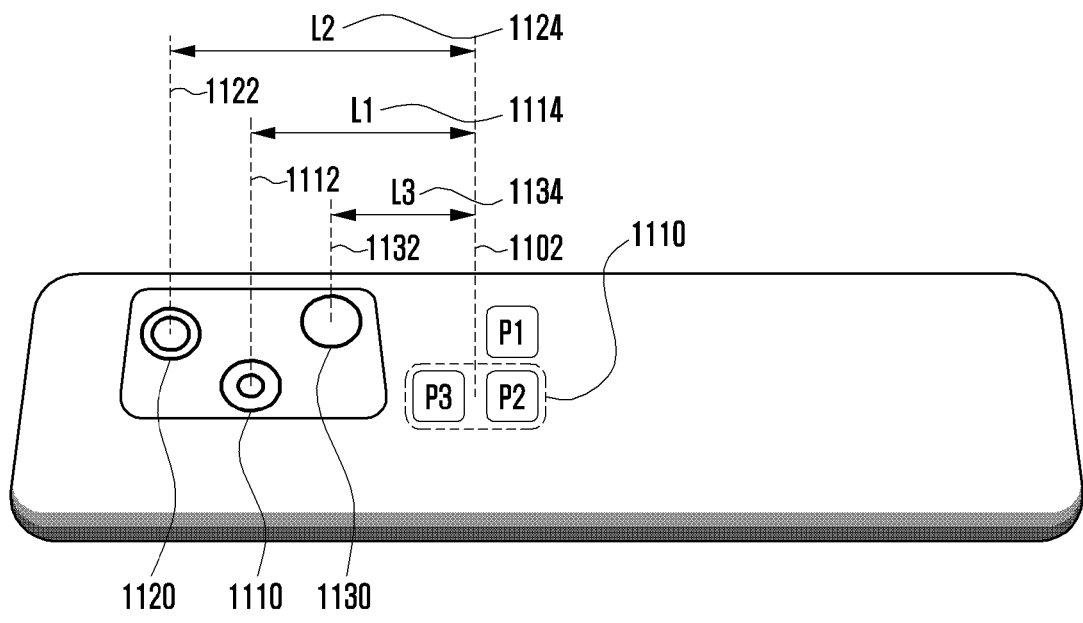
FIG. 11A is an example illustrating the distance between a camera module and a position estimation module in a horizontal direction in electronic device according to an embodiment of the disclosure.
Figure 11B:
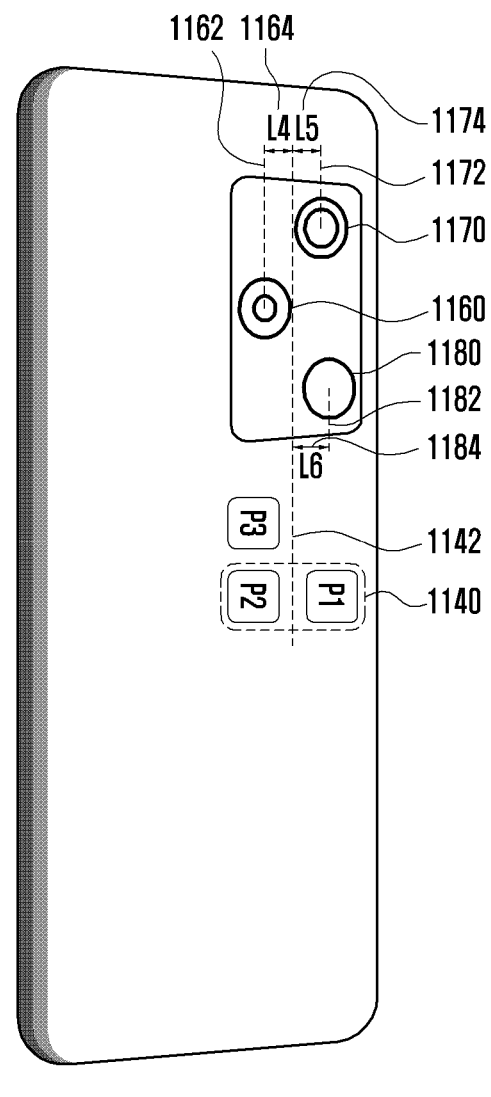
FIG. 11B is an example illustrating the distance between a camera module and a position estimation module in a vertical direction in electronic device according to an embodiment of the disclosure.

FIG. 11A is an example illustrating a distance between a camera module and a position estimation module in a horizontal direction in an electronic device according to an embodiment of the disclosure. FIG. 11B is an example illustrating a distance between a camera module and a position estimation module in a vertical direction in an electronic device according to an embodiment of the disclosure.

Referring to FIG. 10, according to various embodiments, the electronic device (e.g., the processor 120 of FIG. 1 or the processor 410 of FIG. 4) may identify whether orientation of the electronic device is in a horizontal direction, based on an operation state of the electronic device, in operation 1001. According to an embodiment, the processor 410 may identify a direction of the electronic device 400, based on sensor data acquired through a sensor module (e.g., a gyro sensor and/or an acceleration sensor). According to an embodiment, the processor 410 may configure a virtual coordinate space, based on azimuth (e.g., yaw, pitch and/or roll value) measured in a 9-axis motion sensor. The processor 410 may distinguish an area of the virtual coordination space as a horizontal direction (landscape) range, and the other area thereof as a vertical direction (portrait) range. For example, the processor 410 may determine the direction of the electronic device 400 as the horizontal direction when a current state of the electronic device 400 is included in the horizontal direction range. For example, the horizontal direction of the electronic device 400 may represent a state in which a parallel and long surface of the electronic device 400 is mounted along a horizontal axis parallel to the ground. For example, the processor 410 may determine the direction of the electronic device 400 is in the vertical direction when the current state of the electronic device 400 is included in the vertical direction range. For example, the vertical direction of the electronic device 400 may represent a state in which the parallel and long surface of the electronic device 400 is mounted along a vertical axis perpendicular to the ground.

According to various embodiments, the electronic device (e.g., the processor 120 or 410) may identify a third distance between the camera module (e.g., the camera module 430) and the position estimation module (e.g., the position estimation module 420) in the horizontal direction, in operation 1003, when the direction of the electronic device is in the horizontal direction (e.g., Yes in operation 1001). According to an embodiment, the processor 410 may identify a distance L1 1114 between a central axis 1102 of the position estimation module 420 and a central axis 1112 of a first camera 1110 stored in the memory 450, when the first camera 1110 is activated in order to acquire the image information in a state wherein the electronic device 400 is in the horizontal direction. For example, the central axis 1102 of the position estimation module 420 may include the central axes of antennas 1100 (e.g., the second antenna P2 and the third antenna P3) used for estimating the position of the external device by the position estimation module 420, in the horizontal direction. According to an embodiment, the processor 410 may identify a distance L2 1124 between the central axis 1102 of the position estimation module 420 and a central axis 1122 of a second camera 1120 stored in the memory 450, when the second camera 1120 is activated, in order to acquire the image information in a state wherein the electronic device 400 is in the horizontal direction. According to an embodiment, the processor 410 may identify a distance L3 1134 between the central axis 1102 of the position estimation module 420 and a central axis 1132 of a third camera 1130 stored in the memory 450, when the third camera 1130 is activated in order to acquire the image information in a state wherein the electronic device 400 is in the horizontal direction.

According to various embodiments, the electronic device (e.g., the processor 120 or 410) may identify a fourth distance between the camera module (e.g., the camera module 430) and the position estimation module (e.g., the position estimation module 420) in the vertical direction, in operation 1005, when the direction of the electronic device is in the vertical direction (e.g., No in operation 1001). According to an embodiment, the processor 410 may identify a distance L4 1164 between a central axis 1142 of the position estimation module 420 and a central axis 1162 of a first camera 1160 stored in the memory 450, when the first camera 1160 is activated in order to acquire the image information in a state in which the electronic device 400 is in the vertical direction. For example, the central axis 1142 of the position estimation module 420 may include the central axes of antennas 1140 (e.g., the first antenna P1 and the second antenna P2) used for estimating the position of the external device by the position estimation module 420, in the vertical direction. According to an embodiment, the processor 410 may identify a distance L5 1174 between the central axis 1142 of the position estimation module 420 and a central axis 1172 of a second camera 1170 stored in the memory 450, when the second camera 1170 is activated in order to acquire the image information in a state in which the electronic device 400 is in the vertical direction. According to an embodiment, the processor 410 may identify a distance L6 1184 between the central axis 1142 of the position estimation module 420 and a central axis 1182 of a third camera 1180 stored in the memory 450, when the third camera 1180 is activated in order to acquire the image information in a state in which the electronic device 400 is in the vertical direction.

According to various embodiments, the electronic device (e.g., the processor 120 or 410) may correct again the position information of the external device acquired through the position estimation module 420 to correspond to the arrangement position of the switched camera module 430, based on a direction switching of the electronic device. According to an embodiment, the processor 410 may provide at least one function (e.g., augmented reality function), based on the position information of the external device corrected by the operations 501 to 507 in FIG. 5. The processor 410 may identify the distance between the camera module 430 and the position estimation module 420 corresponding to a direction switching of the electronic device 400 when the direction of the electronic device 400 is switched in a state in which the positions of the external device and the electronic device 400 are maintained while providing at least one function. The processor 410 may correct again the position information of the external device acquired through position estimation module 420 to correspond to the arrangement position of the camera module 430, based on the distance between the camera module 430 and the position estimation module 420 corresponding to the direction switching of the electronic device 400.

According to various embodiments, the electronic device (e.g., the processor 120 or 410) may correct position information of the external device acquired through the position estimation module 420 to correspond to the arrangement position of the camera module 430, based on the distance between the position estimation module 420 and the camera module 430 in the vertical direction and the distance between the position estimation module 420 and the camera module 430 in the horizontal direction, when estimating a three-dimensional position of the external device. According to an embodiment, the processor 410 may estimate a three-dimensional position of the external device, based on a first angle (e.g., AoA) of the external device, estimated through the antennas (e.g., the first antenna P1 and the second antenna P2) disposed in a first axis at a first time point, and a second angle (e.g., AoA) of the external device estimated through the antennas (e.g., the second antenna P2 and the third antenna P3) disposed in a second axis at a second time point. For example, the central axis of the position estimation module 420 may be changed based on the antennas arrangement used for estimating the position of the external device. For example, the central axis of the position estimation module 420 may include the central axis 1142 of the position estimation module 420 illustrated in FIG. 11B when the first antenna P1 and the second antenna P2 disposed in the first axis at the first time point are used. For example, the central axis of the position estimation module 420 may include the central axis 1102 of the position estimation module 420 illustrated in FIG. 11A when the second antenna P2 and the third antenna P3 disposed in the second axis at the second time point are used. Accordingly, the processor 410 may correct position information of the external device acquired at the first time point, based on the distance between the position estimation module 420 and the camera module 430 in the vertical direction, and may correct the position information of the external device acquired at the second time point, based on the distance between the position estimation module 420 and the camera module 430 in the horizontal direction.

According to an embodiment, the processor 410 may estimate a three-dimensional position of the external device by applying weight to the first angle (e.g., AoA) estimated through the antennas (e.g., the first antenna P1 and the second antenna P2) disposed in the first axis at the first time point, and/or the second angle (e.g., AoA) of the external device estimated through the antennas (e.g., the second antenna P2 and the third antenna P3) disposed in the second axis at the second time point. For example, the processor 410 may apply weight to the second angle with respect to the external device estimated through the antennas (e.g., the second antenna P2 and the third antenna P3) disposed in the second axis related to the horizontal direction when the electronic device 400 is in the horizontal direction. For example, the processor 410 may apply weight to the first angle with respect to the external device estimated through the antennas (e.g., the first antenna P1 and the second antenna P2) disposed in the first axis related to the vertical direction when the electronic device 400 is in the vertical direction. For example, the weight may represent a reference ratio of the first angle and the second angle, for estimating the position of the external device, and the reference ratio of the angle to which the weight is applied may be relatively higher than that of the angle to which the weight is not applied. According to another embodiment, when estimating the three-dimensional position of the external device by activating the first antenna 230a, the second antenna 230b and the third antenna 230c of the position estimation module 420 at the same time, the electronic device may correct the position information of the external device, based on the distance between the camera module 420 and the central axis of the position estimation module 420 according to the horizontal direction or the vertical direction.

Figure 12:
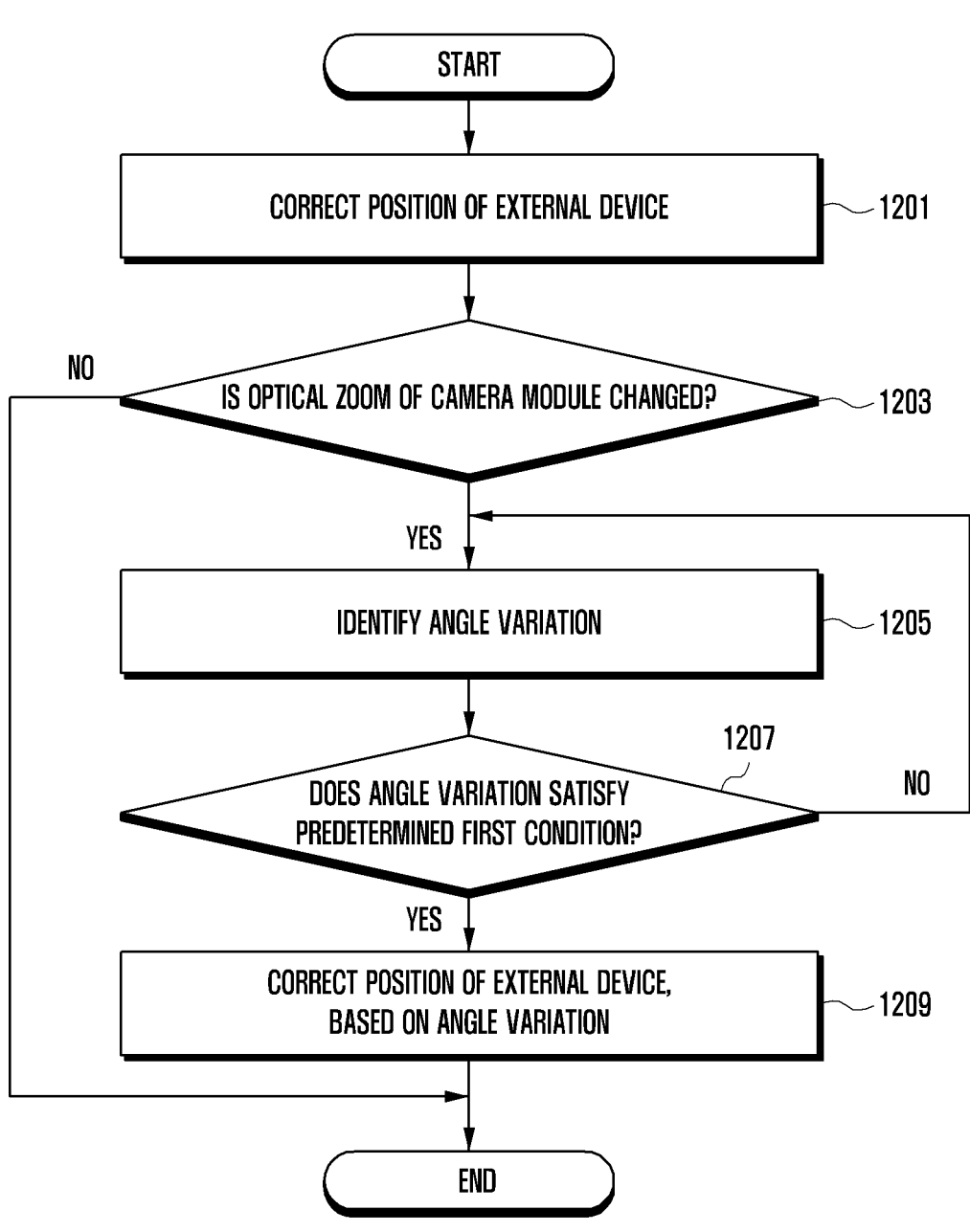
FIG. 12 is a flowchart for correcting a position of an external device, based on an optical zoom, in an electronic device according to an embodiment of the disclosure.

FIG. 12 is a flowchart for correcting a position of an external device, based on an optical zoom, in an electronic device according to an embodiment of the disclosure. Hereinafter, in an embodiment, operations may be sequentially performed, but are not always sequentially performed. For example, the order of the operations may be switched, and at least two operations may be performed in parallel. For example, the electronic device of FIG. 12 may be the electronic device 101 of FIG. 1, the electronic device 200 of FIG. 2A, the electronic device 300 of FIG. 3A or the electronic device 400 of FIG. 4.

Referring to FIG. 12, according to various embodiments, the electronic device (e.g., the processor 120 of FIG. 1 or the processor 410 of FIG. 4) may correct position information of an external device acquired through a position estimation module (e.g., the position estimation module 420 of FIG. 4), in operation 1201, based on the distance between the position estimation module (e.g., position estimation module 420) and the camera module (e.g., the camera module 430 of FIG. 4). According to an embodiment, the processor 410 may correct position information of the external device acquired through the position estimation module 420 to correspond to the arrangement position of the camera module 430, based on the distance between the position estimation module 420 and the camera module 430, as illustrated in the operations 501 to 507 of FIG. 5. For example, the processor 410 may correct position information of the external device acquired through the position estimation module 420, based on an optical magnification of the camera module 430 and/or the distance between the position estimation module 420 and the camera module 430.

According to various embodiments, the electronic device (e.g., the processor 120 or 410) may identify whether the magnification of the optical zoom of the camera module (e.g., the camera module 430) is changed, in operation 1203. For example, the optical zoom may include a function of increasing or reducing the image information (e.g., image) acquired through the camera module 430 by controlling a focus distance of a lens included in the camera module 430.

According to various embodiments, the electronic device (e.g., the processor 120 or 410) may end an embodiment for correcting the position of the external device when the magnification of the optical zoom of the camera module (e.g., the camera module 430) is not changed (e.g., No in operation 1203).

According to various embodiments, the electronic device (e.g., the processor 120 or 410) may identify an angle variation between a central axis of the camera module 430 and a central axis of the position estimation module 420 generated based on a magnification change of the optical zoom, in operation 1205, when the magnification of the optical zoom of the camera module (e.g., the camera module 430) is changed (e.g., Yes in operation 1203).

According to various embodiments, the electronic device (e.g., the processor 120 or 410) may identify whether the angle variation between the central axis of the position estimation module (e.g., the position estimation module 420) and the central axis of the camera module (e.g., the camera module 430) satisfies the predetermined first condition, in operation 1207. For example, the predetermined first condition may include a fixed value as a reference variation for determining a correction time of the position information of the external device, and may be configured (or changed) based on a user input.

According to various embodiments, the electronic device (e.g., the processor 120 or 410) may identify the angle variation between the central axis of the camera module 430 and the central axis of the position estimation module 420 generated based on the magnification change of the optical zoom, in operation 1205, when the angle variation between the central axis of the camera module (e.g., the camera module 430) and the central axis of the position estimation module (e.g., the position estimation module 420) does not satisfy the predetermined first condition (e.g., No in operation 1207).

According to various embodiments, the electronic device (e.g., the processor 120 or 410) may correct the position of the external device, based on the angle variation between the central axis of the camera module (e.g., the camera module 430) and the central axis of the position estimation module (e.g., the position estimation module 420) in operation 1209, when the angle variation between the central axis of the camera module (e.g., the camera module 430) and the central axis of the position estimation module (e.g., the position estimation module 420) satisfies the predetermined first condition (e.g., Yes in operation 1207). According to various embodiments, the processor 410 may correct the position information of the external device acquired through the position estimation module 420, based on the angle between the central axis of the camera module 430 and the central axis of the position estimation module 420 and/or the distance between the camera module 430 and the position estimation module 420. For example, the processor 410 may apply (e.g., add or subtract) the angle changed between the central axis of the camera module 430 and the central axis of the position estimation module 420 to the angle with respect to the external device acquired through the position estimation module 420. The processor 410 may correct the position of the external device, to which the angle changed between the central axis of the camera module 430 and the central axis of the position estimation module 420 is applied, based on the distance between the camera module 430 and the position estimation module 420.

Figure 13:
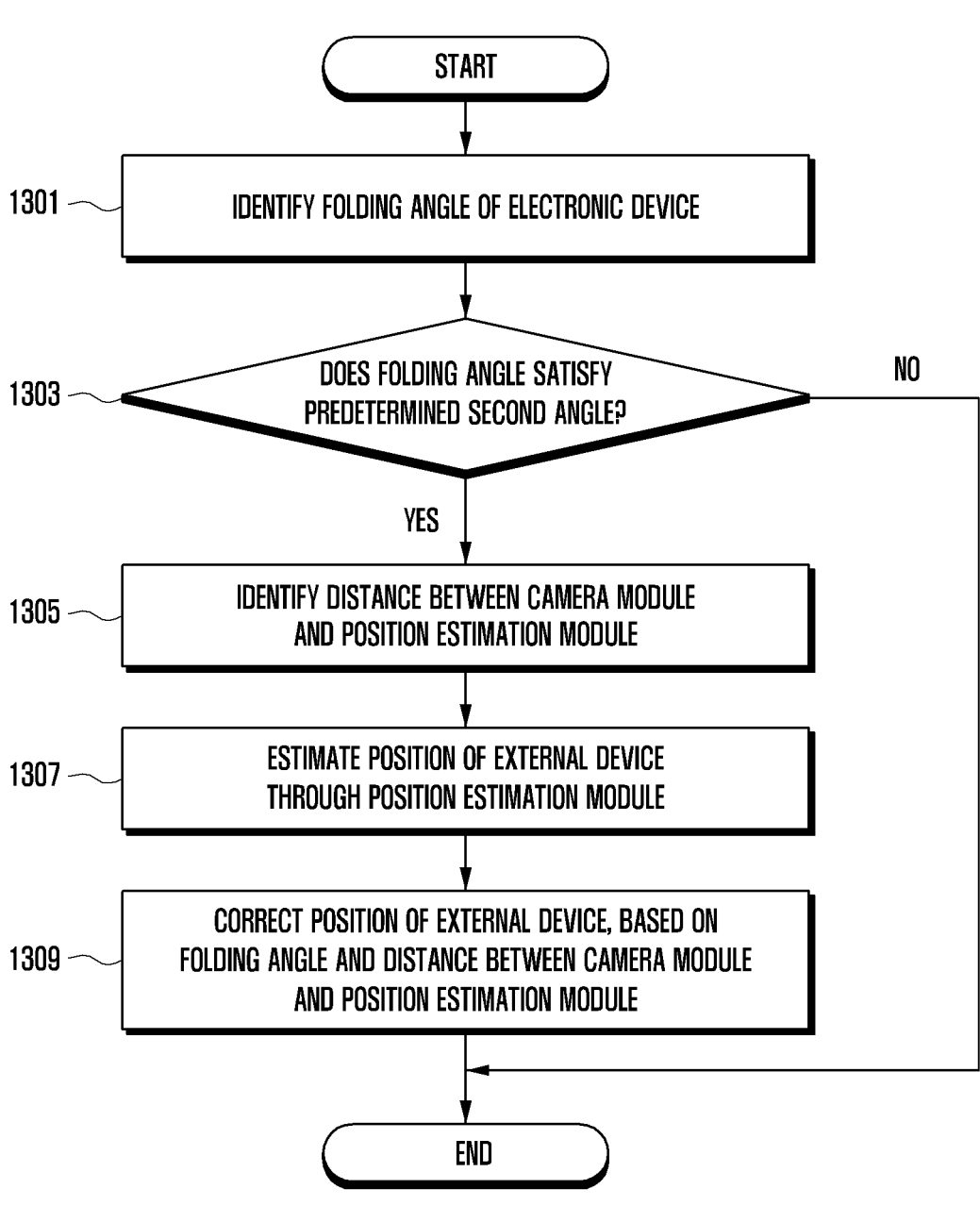
FIG. 13 is a flowchart for correcting a position of an external device, based on a folding angle, in an electronic device according to an embodiment of the disclosure.

FIG. 13 is a flowchart for correcting a position of an external device, based on a folding angle, in an electronic device according to an embodiment of the disclosure. Hereinafter, in an embodiment, operations may be sequentially performed, but are not always sequentially performed. For example, the order of the operations may be switched, and at least two operations may be performed in parallel. For example, the electronic device of FIG. 13 may be the electronic device 101 of FIG. 1, the electronic device 200 of FIG. 2A, the electronic device 300 of FIG. 3A or the electronic device 400 of FIG. 4. For example, at least a part of components of FIG. 13 may be described by referring to FIG. 14.

Figure 14:
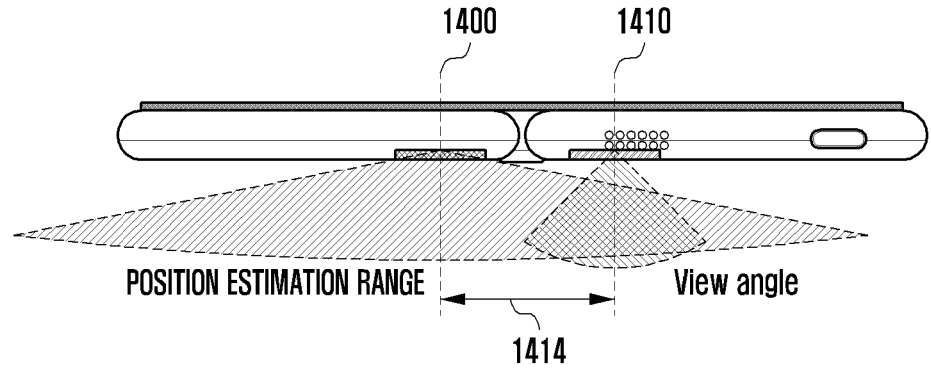
FIG. 14 is an example illustrating the distance between a camera module and a position estimation module in a foldable electronic device according to an embodiment of the disclosure.

FIG. 14 is an example illustrating a distance between a camera module and a position estimation module in a foldable electronic device according to an embodiment of the disclosure.

Referring to FIG. 13, according to various embodiments, the electronic device (e.g., the processor 120 of FIG. 1 or the processor 410 of FIG. 4) may identify a folding angle of the electronic device (e.g., the electronic device 400 of FIG. 4), in operation 1301. The processor 410 according to an embodiment may identify the folding angle between a pair of housings (e.g., the first housing 310 or the second housing 320 of FIG. 3A) rotatably coupled to be folded to face each other with reference to the hinge module (e.g., the hinge module 340 of FIG. 3B). For example, the processor 410 may identify the folding angle between the first housing and the second housing 320, based on sensor data acquired through the sensor module (e.g., a gyro sensor, an acceleration sensor, an angle sensor, an infrared light sensor, a hole sensor, a capacitance type sensor, an ultrasonic waves sensor and/or a magnetic sensor) disposed in the first housing 310 and/or the second hosing 320. For example, the folding angle between the first housing 310 and the second housing 320 may represent the angle between the central axis of the camera module 430 disposed in the first housing 310 and the central axis of the position estimation module 420 disposed in the second housing 320. According to an embodiment, the sensor module may include the angle sensor (e.g., rotary sensor). For example, the angle sensor may be disposed to be connected to the hinge structure. For example, the angle sensor may measure the folding angle between the first housing 310 and the second housing 320 by using a magnet.

According to various embodiments, the electronic device (e.g., the processor 120 or 410) may identify whether the folding angle of the electronic device (e.g., the electronic device 400 of FIG. 4) satisfies the predetermined second condition, in operation 1303. According to an embodiment, the predetermined second condition may include an angle range for determining whether it is possible to correct the position information of the external device acquired through the position estimation module 420 disposed in the second housing 320 to correspond to the arrangement position of the camera module 430 disposed in the first housing 310, in a foldable electronic device (e.g., the electronic device 300 of FIG. 3A). For example, the predetermined second condition may include a range from the unfolded state (e.g., about 180 degrees) of the first housing 310 and the second housing 320 to the folding angle to allow the position information of the external device acquired through the position estimation module 420 to be corrected to correspond to the arrangement position of the camera module 430.

According to various embodiments, the electronic device (e.g., the processor 120 or 410) may determine that the position information of the external device acquired through the position estimation module 420 cannot be corrected to correspond to the arrangement position of the camera module 430, when the folding angle of the electronic device (e.g., the electronic device 400 of FIG. 4) does not satisfy the predetermined second condition (e.g., No in operation 1303). Accordingly, the electronic device (e.g., the processor 120 or 410) may end the embodiment for correcting the position of the external device. For example, the electronic device 400 may control virtual object information displayed on the display to be deleted when it is determined that the position of the external device cannot be corrected. In another embodiment, when it is determined that the position of the external device cannot be corrected, the electronic device 400 may display information related to notification in which the position of the external device cannot be corrected, on the display, through a user interface.

According to various embodiments, the electronic device (e.g., the processor 120 or 410) may identify the distance between the position estimation module (e.g., the position estimation module 420 of FIG. 4) and the camera module (the camera module 430 of FIG. 4), in operation 1305, when the folding angle of the electronic device (e.g., the electronic device 400 of FIG. 4) satisfies the predetermined second condition (e.g., Yes in operation 1303). According to an embodiment, the processor 410 may acquire information related to the distance between the position estimation module 420 and the camera module 430 from the memory 450. For example, the distance between the position estimation module 420 and the camera module 430 may include a distance 1414 between a central axis 1400 of the position estimation module 420 and a central axis 1410 of the camera module 420, in the unfolded state of the first housing 310 and the second housing 320, as illustrated in FIG. 14.

According to various embodiments, the electronic device (e.g., the processor 120 or 410 or the position estimation module 420) may estimate the position of the external device through the position estimation module (e.g., the position estimation module 420 of FIG. 4), in operation 1307. According to an embodiment, the position estimation module 420 may measure the distance between the electronic device 400 and the external device, based on a difference between a time point of receiving a response signal (e.g., ranging response signal) from the external device and a time point of transmitting a signal (e.g., ranging request signal) to the external device, through the communication channel established with the external device (e.g., the electronic device 102 of FIG. 1). According to an embodiment, the position estimation module 420 may estimate the angle (e.g., AoA) of the external device, based on a phase difference of the signal received from the external device through at least two antennas (e.g., the second antenna P2 and the third antenna P3 of FIG. 11A).

According to various embodiments, the electronic device (e.g., the processor 120 or 410) may correct the position of the external device acquired through the position estimated module, based on the folding angle and/or the distance between the position estimation module (e.g., the position estimation module 420 of FIG. 4) and the camera module (e.g., the camera module 430 of FIG. 4), in operation 1309. According to an embodiment, the position information of the external device acquired through the position estimation module 420 may be corrected to correspond to the arrangement position of the camera module 430, based on the folding angle and/or the distance between the position estimation module 420 and the camera module 430. For example, the processor 410 may apply (e.g., add or subtract) the folding angle to the angle with respect to the external device acquired through the position estimation module 420. The processor 410 may correct the position of the external device to which the folding angle is applied, based on the distance between the camera module 430 and the position estimation module 420. For example, in an application of the folding angle, an operation of subtracting the folding angle from the angle with respect to the external device acquired through the position estimation module 420 may be performed, in case of an in-folding manner. For example, the in-folding manner may include a method in which the first surface 311 of the first housing 310 in which the flexible display 370 is disposed and the third surface 321 of the second housing 320 face each other, in a state in which the first housing 310 and the second housing 320 are folded with reference to the hinge module. For example, in the application of the folding angle, an operation of adding the folding angle to the angle with respect to the external device acquired through the position estimation module 420 may be performed, in case of an out-folding manner. For example, the out-folding manner may include a method in which the first surface 311 of the first housing 310 in which the flexible display 370 is disposed and the third surface 321 of the second housing 320 are oriented in opposite directions, in a state in which the first housing 310 and the second housing 320 are folded with reference to the hinge module.

Figure 15:
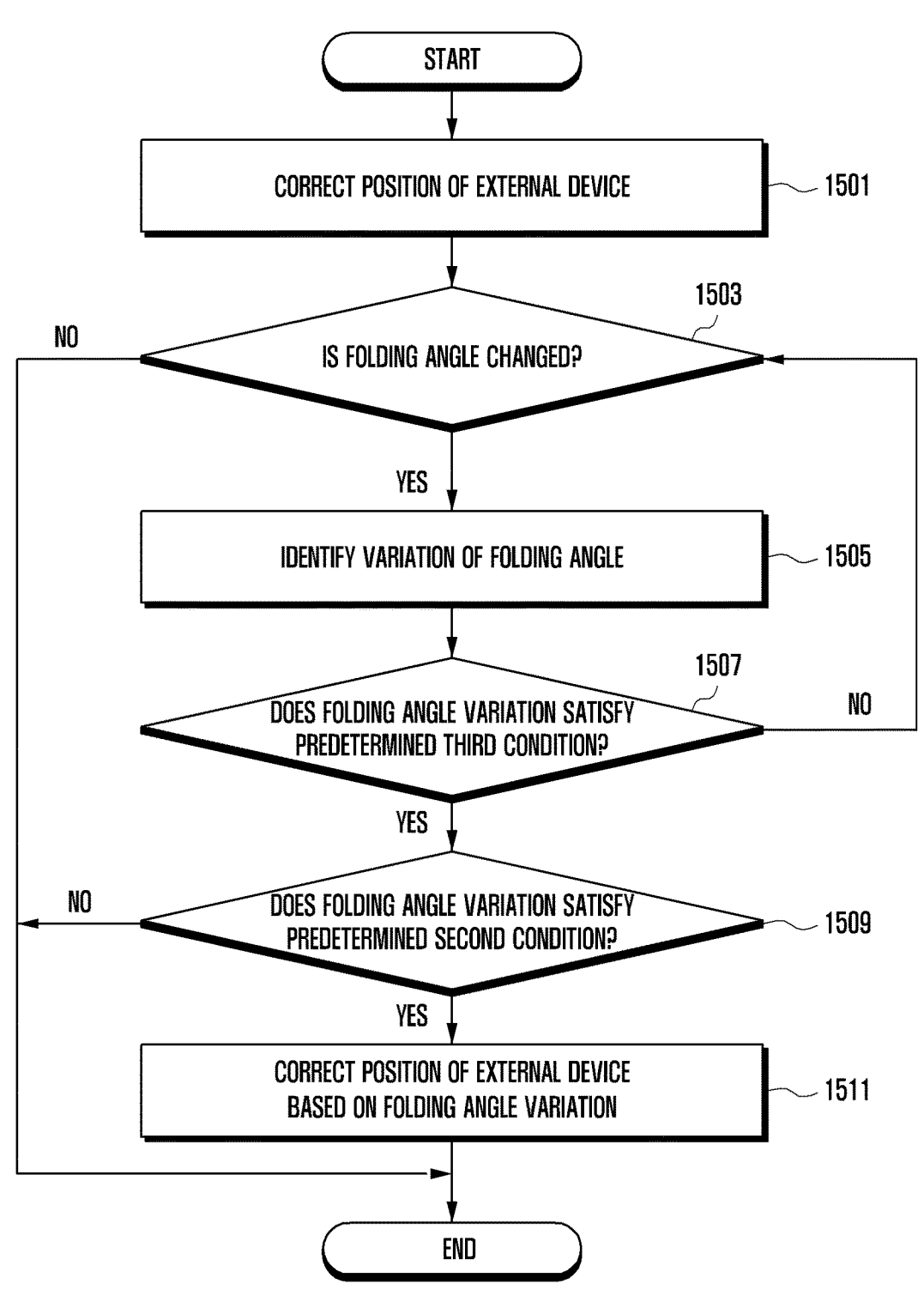
FIG. 15 is a flowchart for correcting a position of an external device, based on a folding angle change, in an electronic device according to an embodiment of the disclosure.

FIG. 15 is a flowchart for correcting a position of an external device, based on a folding angle change, in an electronic device according to an embodiment of the disclosure. Hereinafter, in an embodiment, operations may be sequentially performed, but are not always sequentially performed. For example, the order of the operations may be switched, and at least two operations may be performed in parallel. For example, the electronic device of FIG. 15 may be the electronic device 101 of FIG. 1, the electronic device 200 of FIG. 2A, the electronic device 300 of FIG. 3A or the electronic device 400 of FIG. 4. For example, at least a part of components of FIG. 15 may be described by referring to FIG. 16.

Figure 16:
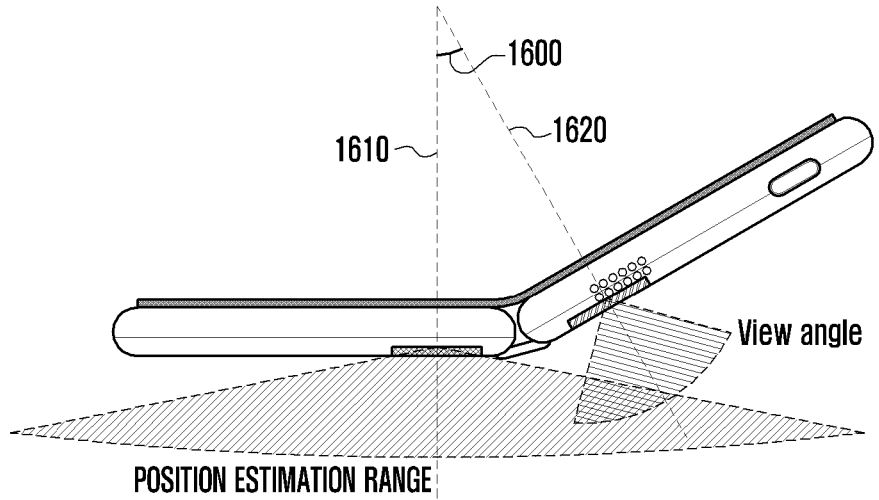
FIG. 16 is an example illustrating a change of a folding angle in a foldable electronic device according to an embodiment of the disclosure.

FIG. 16 is an example illustrating a change of a folding angle in a foldable electronic device according to an embodiment of the disclosure.

Referring to FIG. 15, according to various embodiments, the electronic device (e.g., the processor 120 of FIG. 1 or the processor 410 of FIG. 4) may correct position information of the external device acquired through a position estimation module (e.g., the position estimation module 420 of FIG. 4), based on the distance between the position estimation module (e.g., position estimation module 420) and the camera module (e.g., the camera module 430 of FIG. 4), in operation 1501. The processor 410 according to an embodiment may correct the position information of the external device acquired through the position estimation module 420 to correspond to the arrangement position of the camera module 430, based on the distance between the position estimation module 420 and the camera module 430, as illustrated in operations 1301 to 1309 of FIG. 13. For example, the processor 410 may correct the position information of the external device acquired through the position estimation module 420, based on the folding angle and/or the distance between the position estimation module 420 and the camera module 430.

According to various embodiments, the electronic device (e.g., the processor 120 or 410) may identify whether the folding angle of the electronic device (e.g., the electronic device 400 of FIG. 4) is changed, in operation 1503. According to an embodiment, the processor 410 may identify whether the folding angle between the first housing 310 and the second housing 320 is changed based on sensor data acquired through a sensor module (e.g., a gyro sensor, an acceleration sensor, an angle sensor, an infrared light sensor, a hole sensor, a capacitance type sensor, an ultrasonic waves sensor and/or a magnetic sensor) disposed in the first housing 310 and/or the second hosing 320.

According to various embodiments, the electronic device (e.g., the processor 120 or 410) may identify the angle variation of the folding angle of the electronic device (e.g., the electronic device 400 of FIG. 4), in operation 1505, when the folding angle of the electronic device (e.g., the electronic device 400 of FIG. 4) is changed (e.g., Yes in operation 1503).

According to various embodiments, the electronic device (e.g., the processor 120 or 410) may identify whether the folding angle variation of the electronic device (e.g., the electronic device 400 of FIG. 4) satisfies the predetermined third condition (e.g., about 5 degrees), in operation 1507. For example, the predetermined third condition may include a reference variation of the folding angle for determining a correction time of the position information of the external device.

According to various embodiments, the electronic device (e.g., the processor 120 or 410) may identify the folding angle variation of the electronic device (e.g., the electronic device 400 of FIG. 4), in operation 1505, when the folding angle variation of the electronic device (e.g., the electronic device 400 of FIG. 4) does not satisfy the predetermined third condition (e.g., No in operation 1507).

According to various embodiments, the electronic device (e.g., the processor 120 or 410) may identify whether the changed folding angle of the electronic device (e.g., the electronic device 400 of FIG. 4) satisfies the predetermined second condition, in operation 1509, when the folding angle variation of the electronic device (e.g., the electronic device 400 of FIG. 4) satisfies the predetermined third condition (e.g., Yes in operation 1507). According to an embodiment, the processor 410 may determine the position information of the external device to be corrected, based on the angle change between the central axis of the camera module 430 and the central axis of the position estimation module 420, based on the folding angle change of the electronic device 400, when the folding angle variation of the electronic device 400 satisfies the predetermined third condition. For example, the folding angle between the first housing 310 and the second hosing 320 may represent the angle 1600 between a central axis 1610 of the position estimation module 420 disposed in the second housing 320 and a central axis 1620 of the camera module 430 disposed in the first housing 310. Accordingly, the processor 410 may identify whether the changed folding angle of the electronic device 400 satisfies the predetermined second condition. For example, the predetermined second condition may include an angle range for determining whether it is possible to correct the position information of the external device acquired through the position estimation module 420 disposed in the second housing 320 to correspond to the arrangement position of the camera module 430 disposed in the first housing 310 in the foldable electronic device (e.g., the electronic device 300 of FIG. 3A). For example, the predetermined second condition may include a range up to the folding angle capable of correcting the position information of the external device acquired through the position estimation module 420 to correspond to the arrangement position of the camera module 430, from the unfolded state (e.g., about 180 degrees) of the first housing 310 and the second housing 320.

According to various embodiments, the electronic device (e.g., the processor 120 or 410) may correct the position of the external device acquired through the position estimated module in operation 1511, based on the folding angle and/or the distance between the position estimation module (e.g., the position estimation module 420 of FIG. 4) and the camera module (e.g., the camera module 430 of FIG. 4), when the changed folding angle of the electronic device (e.g., the electronic device 400 of FIG. 4) satisfies the predetermined second condition (e.g., Yes in operation 1509). According to an embodiment, the processor 410 may correct the position information of the external device acquired through the position estimated module 420 to correspond to the arrangement position and/or the folding angle of the camera module 430 (e.g., a second camera), based on the folding angle change in a state in which the positions of the external device and the electronic device 400 are maintained while providing at least one function, based on the corrected position information of the external device. For example, the processor 410 may determine that the angle with respect to the external device is about 13 degrees (e.g., 20 degrees-7 degrees) to correspond to the arrangement position of the camera module 430 (e.g., the second camera) when the angle with respect to the external device acquired through the position estimation module 420 is about 20 degrees, and the folding angle change is about 7 degrees.

According to various embodiments, the electronic device (e.g., the processor 120 or 410) may end the embodiment for correcting the position of the external device, when the folding angle of the electronic device (e.g., the electronic device 400 of FIG. 4) is not changed (e.g., No in operation 1503) or the changed folding angle of the electronic device (e.g., the electronic device 400 of FIG. 4) does not satisfy the predetermined second condition (e.g., No in operation 1509).

According to various embodiments, the state in which the positions of the electronic device 400 and the external device are maintained is described, but it is not limited thereto. The electronic device 400 may perform the position correction of the external device, based on movement information (e.g., a moving direction, a moving distance and/or a position) of the electronic device 400 and/or the external device when the movement of the electronic device 400 and/or the external device is detected through the sensor module (e.g., a gyro sensor and/or an acceleration sensor) and/or the position estimation module 420.

According to various embodiments, the electronic device 400 may have an appearance of a bar type, a plate type, or a foldable electronic device, but it is not limited thereto. For example, the electronic device as illustrated may be a part of a rollable electronic device. The rollable electronic device may mean an electronic device, at least a part of which is wound or rolled since the display (e.g., the display 370 of FIG. 3A) can be bent and changed, and which is accommodated in the housing (e.g., the housing 310 of FIG. 3A). The rollable electronic device may be used to extend a screen display area by exposing a wider area of the display to the outside or by unfolding the display according to user's requirement.

According to various embodiments of the disclosure, a method of operating the electronic device (e.g., the electronic device 101 of FIG. 1, the electronic device 200 of FIG. 2A, the electronic device 300 of FIG. 3A or the electronic device 400 of FIG. 4) may include identifying the first distance between the first camera module (e.g., the camera module 180 of FIG. 1, the second camera device 212 of FIG. 2A, the second camera device 308 of FIG. 3C or the camera module 430 of FIG. 4) disposed in the first region in the inner space of the electronic device and the position estimation module (e.g., the wireless communication module 192 of FIG. 1, the antenna module 230 of FIG. 2A, the antenna module 380 of FIG. 3C or the position estimation module 420 of FIG. 4) disposed in the second region different from the first region in the inner space, estimating the position of the external device through the position estimation module, and correcting the position of the object related to the external device in the image information acquired through the first camera module, based on the first distance and the estimated position of the external device.

According to various embodiments, the estimating the position of the external device may include estimating the distance from and/or the angle with respect to the external device through the position estimation module of the ultra-wideband (UWB) method.

According to various embodiments, the first distance may include the distance between the central axis of the view angle of the first camera module and the central axis of the range for estimating the position of the external device by the position estimation module.

According to various embodiments, the central axis of the range for estimating the position of the external device by the position estimation module may include the central axes of at least two antennas used for estimating the position of the external device, among the plurality of antennas, usable for estimating the position of the external device by the position estimation module.

According to various embodiments, the first distance may include the distance between the central axis of the view angle of the first camera module corresponding to orientation of the electronic device and the central axis of the range for estimating the position of the external device by the position estimation module.

According to various embodiments, the correcting the position of the object related to the external device may include correcting the position of the object related to the external device in the image information acquired through the first camera module, based on the distance up to the estimated external device, the angle of the external device, and the first distance.

According to various embodiments, the displaying the image information acquired through the first camera module on at least a part of the display module of the electronic device and the displaying at least one virtual object on at least a part of the image information displayed on the display module, based on the corrected position of the object related to the external device may be further included.

According to various embodiments, the at least one virtual object may include information related to the application executed in the electronic device or related to the external device.

According to various embodiments, the identifying the angle variations of the central axis of the position estimation module and the central axis of the first camera module, based on the change of the optical zoom when the optical zoom of the first camera module is applied and the correcting the position of the object related to the external device in the image information acquired through the first camera module, based on the change of the optical zoom, when the angle variation satisfies the predetermined condition, may be further included.

According to various embodiments, when the activated camera is switched from the first camera module to the second camera module (e.g., the camera module 180 of FIG. 1, the second camera device 212 of FIG. 2A, the second camera device 308 of FIG. 3C or the camera module 430 of FIG. 4) disposed in the third region different from the first region and the second region in the inner space, the identifying the second distance based on the positions in which the second camera module and the position estimation module are disposed and the correcting the position of the object related to the external device in the image information acquired through the second camera module, based on the second distance and the estimated position of the external device may be further included.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a housing;
a first camera disposed in a first region of an inner space of the housing;
a position estimation device disposed in a second region different from the first region of the inner space;
a processor comprising processing circuitry; and
memory storing instructions,
wherein the instructions, when executed by the processor, cause the electronic device to:
identify a first distance between the first camera and the position estimation device,
estimate a position of an external device via the position estimation device,
correct a position of an object related to the external device in image information acquired via the first camera, using the first distance and the estimated position of the external device,
in response to a change in a magnification of an optical zoom of the first camera after the position of the object has been corrected, identify angle variations of a central axis of the position estimation device and a central axis of the first camera based on the magnification change of an optical zoom, and correct the position of the object in the image information based on the identified angle variations.

2. The electronic device of claim 1, wherein the position estimation device comprises an ultra-wideband (UWB) device.

3. The electronic device of claim 1, wherein the first distance comprises a distance between a central axis of a view angle of the first camera and a central axis of a range for estimating a position of the external device by the position estimation device.

4. The electronic device of claim 3, further comprising:
a plurality of antennas usable for estimating the position of the external device by the position estimation device,
wherein the central axis of the range for estimating the position of the external device by the position estimation device comprises central axes of at least two antennas used for estimating the position of the external device, among the plurality of antennas.

5. The electronic device of claim 3, wherein the first distance comprises a distance between the central axis of the view angle of the first camera corresponding to orientation of the electronic device and the central axis of the range for estimating the position of the external device by the position estimation device.

6. The electronic device of claim 1, wherein the instructions, when executed by the processor, cause the electronic device to;
correct the position of the object related to the external device in the image information acquired via the first camera, using a distance up to the external device estimated via the position estimation device, an angle between the electronic device and the external device, and the first distance.

7. The electronic device of claim 1, further comprising:
a display,
wherein distance up to the external device estimated via the position estimation device to:
display the image information acquired via the first camera on at least a part of the display, and
display at least one virtual object on at least a part of image information displayed on the display, based on the corrected position of the object related to the external device.

8. The electronic device of claim 1, wherein distance up to the external device estimated via the position estimation device to:
correct the position of the object related to the external device in the image information, based on the identified angle variations when the identified angle variations satisfy a predetermined condition.

9. The electronic device of claim 1, further comprising:
a second camera disposed in a third region different from the first region and the second region in the inner space,
wherein distance up to the external device estimated via the position estimation device to:
identify a second distance based on positions in which the second camera and the position estimation device are disposed when an activated camera is switched from the first camera to the second camera, and
correct the position of the object related to the external device in image information acquired via the second camera, using the second distance and the estimated position of the external device.

10. A method of operating an electronic device, the method comprising:
identifying a first distance between a first camera disposed in a first region in an inner space of the electronic device and a position estimation device disposed in a second region different from the first region in the inner space;
estimating a position of an external device via the position estimation device;
correcting a position of an object related to the external device in image information acquired via the first camera, using the first distance and the estimated position of the external device;
in response to a change in a magnification of an optical zoom of the first camera after the position of the object has been corrected, identifying angle variations of a central axis of the position estimation device and a central axis of the first camera based on the magnification change of an optical zoom; and correcting the position of the object in the image information based on the identified angle variations.

11. The method of claim 10,
wherein the estimating the position of the external device comprises estimating at least one of a distance from or an angle with respect to the external device via the position estimation device, and
wherein the position estimation device comprises an ultra-wideband (UWB) device.

12. The method of claim 10, wherein the first distance comprises a distance between a central axis of a view angle of the first camera and a central axis of a range for estimating the position of the external device by the position estimation device.

13. The method of claim 12, wherein the central axis of the range for estimating the position of the external device by the position estimation device comprises central axes of at least two antennas used for estimating the position of the external device, among a plurality of antennas usable for estimating the position of the external device by the position estimation device.

14. The method of claim 12, wherein the first distance comprises a distance between the central axis of the view angle of the first camera corresponding to orientation of the electronic device and the central axis of the range for estimating the position of the external device by the position estimation device.

15. The method of claim 10, wherein the correcting the position of the object related to the external device comprises correcting the position of the object related to the external device in the image information acquired through via the first camera, using a distance up to the estimated external device, an angle of the external device, and the first distance.

16. The method of claim 10, further comprising:

displaying the image information acquired via the first camera on at least a part of a display of the electronic device, and displaying at least one virtual object on at least a part of the image information displayed on the display, based on the corrected position of the object related to the external device.

17. The method of claim 10, wherein the correcting the position of the object comprises:

correcting the position of the object related to the external device in the image information, based on the identified angel angle variations when the identified angle variations satisfy a predetermined condition.

18. The method of claim 10, further comprising:

identifying a second distance based on positions in which a second camera of the electronic device and the position estimation device are disposed when an activated camera is switched from the first camera to the second camera; and correcting the position of the object related to the external device in image information acquired via the second camera, using the second distance and the estimated position of the external device.

* * * * *